United States Patent [19]

Altermatt et al.

[11] Patent Number: 5,420,254
[45] Date of Patent: May 30, 1995

[54] DISPERSE DYES

[75] Inventors: Ruedi Altermatt, Buckten; Robert Egli, Therwil; Beat Henzi, Basel, all of Switzerland

[73] Assignee: Sandoz Ltd., Basel, Switzerland

[21] Appl. No.: 139,241

[22] Filed: Oct. 19, 1993

[30] Foreign Application Priority Data

Oct. 19, 1992 [DE] Germany .......................... 42 35 137.5
Nov. 6, 1992 [DE] Germany .......................... 42 37 465.0
Jun. 23, 1993 [DE] Germany .......................... 43 20 773.1

[51] Int. Cl.⁶ .................... C09B 29/042; C09B 29/08; C09B 29/09
[52] U.S. Cl. .................... 534/558; 534/550; 534/551; 534/552; 534/560; 534/733; 534/774; 534/761; 534/772; 534/794; 534/795; 8/400
[58] Field of Search .................... 8/400; 534/558, 550, 534/551, 552, 560, 630, 733, 774, 794, 753, 754, 761, 772, 794, 795

[56] References Cited

U.S. PATENT DOCUMENTS 5,055,567 10/1991 Liechti et al. ..................... 534/753
5,116,958  5/1992 Liechti et al. ..................... 534/591
5,298,610  3/1994 Hahn et al. ....................... 534/774

*Primary Examiner*—Arthur C. Prescott
*Attorney, Agent, or Firm*—Robert S. Honor; Carl W. Battle; Carol A. Leoschorn

[57] ABSTRACT

A compound of the formula I

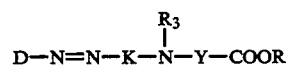

in which
D is a diazo component,

K is an aromatic group of formula a, b or c,

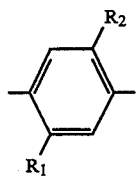

a)

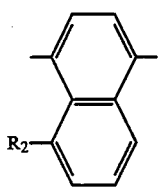

b)

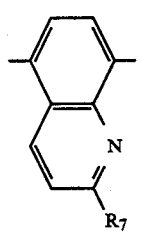

c)

Y is $C_{2-3}$alkylene
and the remaining symbols are as defined in the specification. These compounds are useful for dyeing or printing textile substrates based on synthetic or semisynthetic, hydrophobic, high molecular weight organic materials. Preferably, the textile substrate is made from a linear aromatic polyester, cellulose 2½ acetate or cellulose tri-acetate. The dyeings and prints obtained show good all round fastness properties such as good thermomigration properties, lightfastness, thermofixation, blistering properties as well as good wet fastness properties, especially after thermal fixation.

20 Claims, No Drawings

DISPERSE DYES

According to the invention there is provided a compound of the formula I

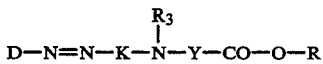

in which
D is a diazo component;
K is an aromatic group of the formula a, b or c a) 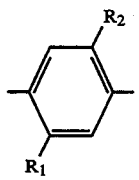

b) 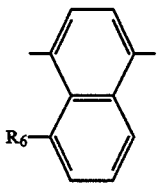

c) 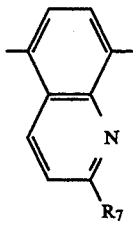

where
R is a group of the formula $-CH(R_4)-CO-O-R_5$, $-CH_2CF_3$ or $-CH_2CF_2CF_2H$;
$R_6$ is hydrogen or hydroxy,
$R_1$ is hydrogen, chloro, $C_{1-4}$ alkyl, $C_{1-4}$ alkoxy or acylamino,
$R_2$ is hydrogen, $C_{1-4}$ alkoxy, $C_{1-4}$ alkoxyethoxy, chloro, bromo and
$R_3$ is selected from hydrogen, $C_{1-6}$ alkyl, $C_{3-4}$ alkenyl, chloro$C_{3-4}$ alkenyl, bromo$C_{3-4}$ alkenyl, $C_{3-4}$ alkynyl, phenyl-$C_{1-4}$ alkyl, $C_{1-4}$ alkoxycarbonyl-$C_{1-4}$ alkyl, $C_{3-4}$ alkenyloxycarbonyl-$C_{1-4}$ alkyl, $C_{3-4}$ alkynyloxycarbonyl-$C_{1-4}$ alkyl, phenoxy-$C_{2-4}$ alkyl, $-CH_2-CH(R_8)CH_2-R_9$ and $C_{2-4}$ alkyl substituted by 1 to 3 groups selected from halogen, cyano, $C_{1-4}$ alkoxy, $C_{1-4}$ alkylcarbonyloxy and $C_{1-4}$ alkoxycarbonyloxy;
or $R_2$ together with $R_3$ in the group a) form a group of the formula-*$CH(CH_3)CH_2C(CH_3)_2$ where the * carbon atom is attached to the group a);
$R_4$ is hydrogen, phenyl or $C_{1-4}$ alkyl,
$R_5$ is phenyl, unsubstituted or substituted by one to three groups selected from halogen (preferably Cl or Br) $C_{1-4}$alkyl, $C_{1-4}$alkoxycarbonyl and $C_{1-4}$alkoxy or phenyl substituted by one group selected from formyl, cyan, rhodan, phenyl, benzyloxy, $C_{1-4}$alkoxycarbonyl-$C_{1-2}$ alkoxy, $C_{1-4}$ alkylcarbonylamino, $C_{1-4}$alkylcarbonyloxy and nitro;

or $R_5$ is alpha or beta naphthyl, phenyl-$C_{1-4}$alkyl or 1-phenyl-propenyl-3, in which the phenyl group (in phenyl $C_{1-4}$alkyl and 1-phenyl propenyl-3) is unsubstituted or substituted by one or two substituents selected from halogen, $C_{1-4}$alkyl and $C_{1-4}$alkoxy or by one nitro or $C_{1-4}$alkoxycarbonyl group; or $R_5$ is allyl, haloallyl, methallyl, propargyl, tetrahydrofuryl-2-methyl, tetrahydropyranyl-2-methyl, chlor-$C_{2-4}$ alkyl, bromo$C_{2-4}$ alkyl or a group of the formula

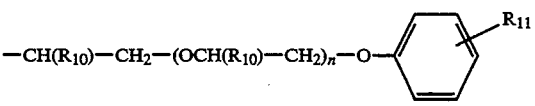

$R_7$ is hydrogen or $C_{1-4}$ alkyl;
$R_8$ is hydroxy, $C_{1-4}$ alkylcarbonyloxy or $C_{1-4}$ alkoxycarbonyloxy;
$R_9$ is chloro, $C_{1-4}$ alkoxy, phenoxy, allyloxy or $C_{1-4}$ alkylcarbonyloxy;
$R_{10}$ is hydrogen or $C_{1-4}$ alkyl;
$R_{11}$ is hydrogen, halogen (preferably chloro or bromo), $C_{1-4}$ alkyl, $C_{1-4}$ alkoxy or nitro
Y is $C_{2-3}$ alkylene and
n is 0 or 1;
with the proviso that when K is a group of formula b) or c), then $R_3$ is hydrogen.

Preferred diazo components D are single or fused carbocyclic or heterocyclic aromatic amines which may bear any of the usual substituents for disperse dyes, preferably excluding water solubilising groups, especially sulpho groups. Examples of such diazo components contain a phenyl, thienyl, thiazolyl, isothiazolyl, thiadiazolyl, pyrazolyl, imidazolyl, triazolyl, benzthiazolyl or benzisothiazolyl group. The compounds of formula I are preferably monoazo compounds.

The aromatic or heteroaromatic rings can bear one to three groups selected from the following: $-COOC_{1-8}$alkyl, halogen (e.g. Cl, Br and I), nitro, cyano, rhodan, $C_{1-4}$alkyl, $C_{1-4}$alkoxy, phenyl and phenoxy and especially on any thienyl or thiazolyl diazo component additionally formyl, $-CH=CH-NO_2$, $-CH=C(CN)_2$ and $-CH=C(CN)-CO-C_{1-8}$alkyl.

Preferred acyl groups include $R_{40}-Z-$ in which $R_{40}$ is a $C_{1-8}$alkyl or phenyl group that may bear one to three groups selected from the following: halogen (e.g. Cl, Br and I), nitro, cyano, rhodan, hydroxy, $C_{1-4}$alkyl, $C_{1-4}$alkoxy, phenyl, $C_{1-4}$ alkoxycarbonyl and phenoxy groups;
Z is a radical $-CO-$ $-O-CO-$, $-CO-O-$, $-SO_2-$ and $-SO_2-N(R_7)$; where * atom is attached to $R_{40}$ and $R_7$ is as defined above;
Preferred acylamino groups are $-NH-Z_1-R_{40}$, where $Z_1$ is $-CO-$;

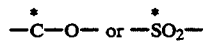

and
In this Specification, any phenyl is unsubstituted or substituted by one or two groups selected from chloro, methyl, ethyl and $C_{1-2}$ alkoxy or one group nitro.

In Y preferably the alkylene group is a group of the formula —CH$_2$CH$_2$—, —CH$_2$—CH(CH$_3$)—, more preferably —CH$_2$CH$_2$—

Preferably R$_{40}$ is R$_{40}'$ where R$_{40}'$ is a C$_{1-4}$ alkyl group or phenyl.

Preferably D is D$_1$ where D$_1$ is a compound of formula 1 to 11 below

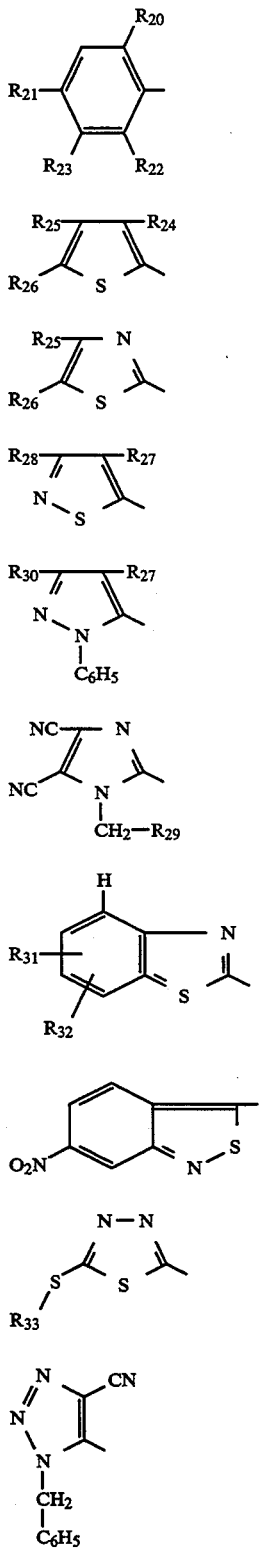

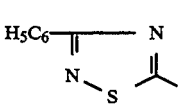

in which
R$_{20}$ is hydrogen, chloro, bromo, cyano, nitro-, C$_{1-4}$alkoxy carbonyl, C$_{1-4}$alkylsulphonyl (preferably hydrogen, cyano, chloro or nitro);

R$_{21}$ is chloro, bromo, nitro, C$_{1-4}$alkyl, C$_{1-4}$alkylsulfonyl, C$_{1-4}$alkylcarbonyl, aminosulfonyl, mono- or di-C$_{1-4}$alkylaminosulfonyl, phenylaminosulfonyl, C$_{1-4}$alkoxycarbonyl, aminocarbonyl, mono- or di-C$_{1-4}$-alkylaminocarbonyl, phenylaminocarbonyl, phenylazo, benzyloxycarbonyl, tetrahydrofurfuryl-2-oxycarbonyl, C$_{3-4}$alkenyloxycarbonyl oder C$_{3-4}$alkinyloxycarbonyl;

R$_{22}$ is hydrogen, chloro, bromo or cyano;
R$_{23}$ is hydrogen or chloro, or when R$_{22}$ is hydrogen, R$_{23}$ is additionally rhodan;
R$_{24}$ is nitro, C$_{1-4}$alkylcarbonyl, C$_{1-4}$alkoxycarbonyl, cyano, aminocarbonyl, mono- or di-C$_{1-2}$alkylaminocarbonyl;
R$_{25}$ is hydrogen, chloro, bromo, C$_{1-4}$alkyl or phenyl;
R$_{26}$ is nitro, cyano, formyl, dicyanovinyl or a group of the formula —CH=CH—NO$_2$, —CH=C(CN)CO—OC$_{1-4}$-alkyl, H$_5$C$_6$—N=N— or 3- or 4—NO$_2$—C$_6$H$_4$—N=N—;
R$_{27}$ is cyano or C$_{1-4}$alkoxycarbonyl;
R$_{28}$ is C$_{1-4}$alkyl or phenyl;
R$_{29}$ is —CN, —CH=CH$_2$ or phenyl;
R$_{30}$ is C$_{1-4}$alkyl;
R$_{31}$ is hydrogen chlor, bromo, cyano, rhodan, nitro, C$_{1-4}$alkoxycarbonyl or di-C$_{1-4}$alkylaminosulfonyl;
R$_{32}$ is hydrogen, chloro, or bromo; and
R$_{33}$ is C$_{1-4}$alkyl, C$_{1-4}$alkylcarbonyl-C$_{1-4}$alkylene or —C$_{1-4}$alkylene-COOCH$_2$CF$_3$ in which any phenyl group present in R$_{20}$ to R$_{30}$ is unsubstituted or substituted by one or two groups selected from chloro, bromo, methyl, ethyl, methoxy and ethoxy.

Preferably K is K$_1$ where K$_1$ is a group of formula a) defined above.

Preferably R is R' where R' is —CH(R$_4'$)—CO—O—R$_5'$ or CH$_2$CF$_3$ where R$_4'$ and R$_5'$ are defined below.

Preferably R$_1$ is R$_1'$ where R$_1'$ is selected from hydrogen, C$_{1-2}$ alkyl, chloro and acylamino, Preferably R$_2$ is R$_2'$ where R$_2'$ is selected from hydrogen, chloro, C$_{1-2}$ alkoxy, C$_{1-2}$ alkoxyethoxy or R$_2'$ (when in formula a) together with R$_3$ forms the group —CH(CH$_3$)CH$_2$C(CH$_3$)$_2$.

Preferably R$_3$ is R$_3'$ where R$_3'$ is selected from hydrogen, C$_{1-4}$ alkyl, cyanoethyl, C$_{1-2}$ alkoxyethyl, C$_{3-4}$ alkenyl, chloroallyl, C$_{3-4}$ alkynyl, C$_{1-2}$ alkoxycarbonylmethyl, allyloxycarbonylmethyl or propargyloxycarbonylmethyl.

Preferably R$_4$ is R$_4'$ where R$_4'$ is selected from hydrogen and C$_{1-2}$ alkyl.

Preferably R$_5$ is R$_5'$ where R$_5'$ is phenyl, unsubstituted or substituted by one or two substituents selected from chloro, C$_{1-2}$alkyl, C$_{1-2}$alkoxy and one phenyl; phenoxy ethyl; phenyl C$_{1-2}$alkyl; or 1-phenylpropenyl-3-, the phenyl group of each of the last three substituents (phenyl C$_{1-2}$ alkyl, phenoxy ethyl or 1-phenylpropenyl-3-) being unsubstituted or substituted by one or two groups selected from chloro, methyl and C$_{1-2}$ alkoxy or one group nitro) or R$_5'$ is alpha and beta naphthyl.

Preferably Y is Y' where Y' is a group of the formula —CH$_2$CH$_2$— or —CH$_2$CH(CH$_3$)—.

More preferably R is R" where R" is is —CH(R$_4$')—CO—O—R$_5'$ where R$_4'$ is selected from hydrogen and C$_{1-2}$ alkyl and where R$_5'$ is phenyl, unsubstituted or substituted by one or two substituents selected from chloro, C$_{1-2}$ alkyl, C$_{1-2}$ alkoxy and one phenyl; phenyl C$_{1-2}$ alkyl, phenoxy ethyl or 1-phenylpropenyl-3 (the phenyl group of each of the last three substituents phenyl C$_{1-2}$ alkyl, phenoxy ethyl or 1-phenylpropenyl-3) being unsubstituted or substituted by one or two groups selected from chloro, methyl and C$_{1-2}$ alkoxy or one group nitro or R$_5'$ is alpha and beta naphthyl.

More preferably R$_3$ is R$_3''$ where R$_3''$ is C$_{1-4}$ alkyl or cyanoethyl.

More preferably R$_5$ is R$_5''$ where R$_5''$ is phenyl, phenoxyethyl or benzyl, in which the phenyl group of each substituent is unsubstituted or substituted by one or two groups selected from chloro, methyl and C$_{1-2}$ alkoxy or one nitro group.

More preferably Y is Y''' where Y''' is 1,2 ethylene.

More preferably D is D$_2$ where D$_2$ is a diazo component of the 2,6-dicyano-4-chlorophenyl, 2,6-dicyano-4-bromo-phenyl, 2,6-dicyano-4-methylphenyl, 2,6-dicyano-4-nitrophenyl; 2,4-dinitro-6-chlorophenyl, 2,4-dinitro-6-bromophenyl, 2,4-dinitro-6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro- or 2-cyano-4-nitrophenyl, 2,4-dinitro-5-chlorophenyl, 2,4-dinitro-5,6-dichlorophenyl, 2,5-dichloro-4-nitro-phenyl, 4-nitrophenyl, 4-phenylazophenyl, 4-C$_{1-4}$alkoxycarbonyl-phenyl, 2-C$_{1-4}$alkoxycarbonyl-4-nitrophenyl, 4-benzyloxycarbonylphenyl, 4-(tetrahydrofurfuryl-2'-oxycarbonyl)-phenyl, 3,5-dicyano-4-chlorothienyl-2,3,5-dicyanothienyl-2,3-cyano-5-nitro-thienyl-2,3-acetyl-5-nitrothienyl-2,3,5-dinitrothienyl-2,3-(C$_{1-4}$alkoxycarbonyl)-5-nitrothienyl-2,5-phenylazo-3-cyanothienyl-2,5-phenylazo-3-cyano-4-methyl-thienyl-2,5-nitrothiazolyl-2,5-nitro-benzisothiazolyl-3,3-methyl-4-cyano-isothiazolyl-5,3-Phenyl-1,2,4-thiadiazolyl-2,5-(C$_{1-2}$alkylmercapto)-1,3,4-thiadiazolyl-2,3-C$_{1-4}$alkoxycarbonylethylmercapto-1,2,4-thiadiazolyl-5,1-cyanomethyl-4,5-dicyano-imidazolyl-2,6-nitrobenzthiazolyl-2,5-nitrobenzthiazolyl-2,6-rhodan-benzthiazolyl-2,6-chlorobenzthiazolyl-2,(5),6,(7)-dichlorobenzthiazolyl-2, or a group of the formula

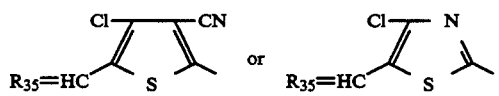

where R$_{35}$ is oxygen or a group of the formula

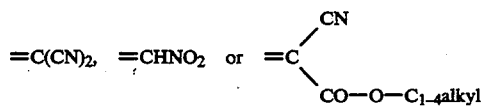

Most preferably R is R''' where R''' is a group of the formula —CH$_2$CO—O—R$_5''$, where R$_5''$ is defined above.

Preferred compounds of formula I are of formula Ia

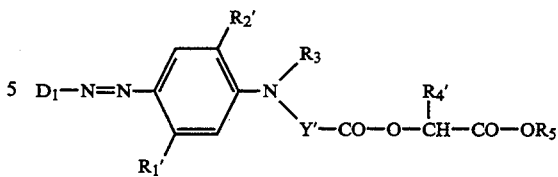

in which the symbols D$_1$, R$_1'$, R$_2'$, R$_3$, Y', R$_4'$ and R$_5$ are as defined above.

In a compound of formula Ia preferably D$_1$ is D$_2$ defined above, more preferably D$_1$ is D$_3$ where D$_3$ is a diazo component of the 2,4-dinitro-6-chlorophenyl, 2,4-dinitro-6-bromophenyl, 2,4-dinitro-6-cyanophenyl, 2,4-dinitro-5-chlorophenyl, 2,4-dinitro-5-rhodan-phenyl, or 2,4-di-nitro-5,6-dichlorophenyl series.

Most preferably D$_1$ is D$_3'$ where D$_3'$ is a diazo component of the 2,4-dinitro-6-chlorophenyl or 2,4-dinitro-6-bromophenyl series.

More preferred compounds of formula I are of formula Ib

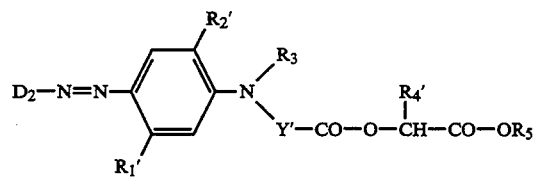

in which the symbols D$_2$, R$_1'$, R$_2'$, R$_3$, Y', R$_4'$ and R$_5$ are as defined above.

Preferred compounds of formula I b are those in which R$_1'$ is R$_1''$ and R$_2'$ is R$_2''$.

Alternatively preferred compounds of formula I are those of formula Ic

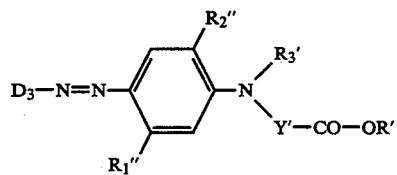

in which D$_3$ is as defined above;
R' is —CH(R$_4'$)—CO—O—R$_5'$ or —CO—O—CH$_2$CF$_3$ where R$_4'$ and R$_5'$ are defined below;
R$_1''$ is acylamino. (Preferably the acyl groups of acylamino are selected from R$_{40}$—Z— defined above, especially NH—COC$_{1-4}$alkyl);
R$_2''$ is C$_{1-2}$ alkoxy or C$_{1-2}$ alkoxyethoxy,
R$_3'$ is selected from hydrogen, C$_{1-2}$ alkoxyethyl, C$_{3-4}$ alkenyl, chloro-C$_{3-4}$alkenyl, C$_{3-4}$alkynyl, C$_{1-2}$ alkoxy-carbonylmethyl, allyloxycarbonylmethyl or propargyl-oxycarbonylmethyl;
R$_4'$ is selected from hydrogen and C$_{1-2}$ alkyl;
R$_5'$ is phenyl, unsubstituted or substituted by one or two substituents selected from chloro, C$_{1-2}$ alkyl, C$_{1-2}$ alkoxy and phenyl; phenyl C$_{1-2}$ alkyl, phenoxy ethyl or 1-phenylpropenyl-3, (the phenyl group of each of the last three substituents (phenyl C$_{1-2}$ alkyl, phenoxy ethyl or 1-phenylpropenyl-3) being unsubstituted or substituted by one or two groups selected from chloro, methyl and C$_{1-2}$ alkoxy or one group nitro) or R$_5'$ is alpha and beta naphthyl; and is a group of the formula —CH$_2$CH$_2$— or —CH$_2$CH(CH$_3$)—.

Alternatively preferred compounds of formula Ic are those in which

D$_3$ is D$_3'$ where D$_3'$ is a diazo component of the 2,4-dinitro-6-chlorophenyl or 2,4-dinitro-6bromophenyl series;

R' is R'" where R'" is a group of the formula —CH$_2$CO—O—R$_5$", where R$_5$" is defined below;

R$_1$" is —NH—COC$_{1-2}$alkyl;

R$_2$" is R$_2$'" where R$_2$'" is C$_{1-2}$alkoxy;

R$_3'$ is R$_{3a}$ where R$_{3a}$ is hydrogen, allyl, chloroallyl or propargyl;

R$_5'$ is R$_5$" where R$_5$" is phenyl, phenoxyethyl or benzyl, in which the phenyl group of each substituent is unsubstituted or substituted by one or two groups selected from chloro, methyl and C$_{1-2}$ alkoxy or one group nitro; and Y' is Y" where Y" is 1,2 ethylene.

Further alternative preferred compounds of formula I are those of formula Id

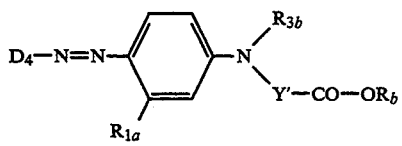

(Id)

in which D$_4$ is a diazo component of the 4-nitrophenyl, 2-chloro-4-nitrophenyl, 2,6-dichloro-4-nitrophenyl, 2-chloro-4-nitro-6-bromophenyl or 2-cyano-4-nitrophenyl series.

R$_{1a}$ is hydrogen, methyl, acylamino or chloro;

R$_b$ is a group of the formula —CH(R$_4$')—CO—O—R$_5'$, where R$_4'$ where R$_4'$ is selected from hydrogen and C$_{1-2}$ alkyl and R$_5'$ is phenyl, unsubstituted or substituted by one or two substituents selected from chloro, C$_{1-2}$ alkyl, C$_{1-2}$ alkoxy and phenyl; phenyl C$_{1-2}$ alkyl, phenoxy ethyl or 1-phenylpropenyl-3 (the phenyl group of each of the last three substituents (phenyl C$_{1-2}$ alkyl, phenoxy ethyl or 1-phenylpropenyl-3) being unsubstituted or substituted by one or two groups selected from chloro, methyl and C$_{1-2}$ alkoxy or one group nitro or R$_5'$ is alpha and beta naphthyl;

R$_{3b}$ is C$_{1-4}$alkyl, cyano-C$_{2-4}$alkyl, C$_{1-4}$alkoxyethyl, —C$_2$H$_4$—O—CO—C$_{1-4}$alkyl, —C$_2$H$_4$—O—CO—OC$_{1-4}$alkyl or benzyl; and Y is Y' where Y' is a group of the formula —CH$_2$CH$_2$— or —CH$_2$CH(CH$_3$)—.

Preferred compounds of formula Id are those in which D$_4$ is D$_5$ where D$_5$ is 2,6-dichloro-4-nitrophenyl or 2-cyano-4-nitrophenyl, R$_{1a}$ is hydrogen, R$_{3b}$ is C$_{1-4}$alkyl, R$_4'$ is hydrogen and Y' is —CH$_2$CH$_2$—.

The compounds of formula I can be prepared by known methods from known compounds. For example the compounds of formula I can be prepared by coupling one mole of a diazotised amine of formula II

(II)

with one mole of a compound of formula III

(III).

Diazotisation and coupling can be carried out by known methods.

The compounds of formula II and III are known or can be made from known compounds by known methods.

The new compounds of formula I exhaust well from aqueous medium onto textile material based on synthetic or semisynthetic, hydrophobic, high molecular weight organic material. In particular the compounds of formula I are useful for dyeing or printing textile material made from linear aromatic polyester, cellulose 2½ acetate and cellulose triacetate. Linear aromatic polyester also include polyester microfibers (ref. Chemie Fasern Industrie, 43 (4) E. 34–36 (1993))

Dyeing and printing can be carried out by known methods, for example as exemplified in French Patent 1,445,371 (GB Patent 1,114,433).

The compounds of the invention have good all round fastness properties, in particular good thermomigration properties, good lightfastness, good thermofixation, good blistering properties as well as good wet fastness properties, especially after thermal fixation (in particular in the M&S C4A household wash test). Worthy of mention is also the suitability of the compounds of formula I for Thermo-Transfer printing.

The invention will be further illustrated by the following Examples in which all parts and percentages are by weight.

EXAMPLE 1

16.3 parts of 2-amino-5-nitrobenzonitrile are stirred into 100 parts of 93% cold sulphuric acid and are then reacted, over 30 minutes with 32 parts of 40% nitrosyl-sulphuric acid at 0°–5° C.

This is stirred for 3 to 4 hours at 0° to 5° C. and the resultant diazonium solution is poured, whilst stirring well onto a mixture of 35.7 parts of 3-(N-methyl-N-phenylamino)propionic acid-(2'-phenoxyethoxycarbonylmethyl ester), 100 parts of glacial acetic acid, 2 parts of amidosulphonic acid, 200 parts of water and 500 parts of ice.

The resultant precipitated dyestuff is filtered, washed salt free with water and dried under vacuum at 60° C. The resulting dyestuff is of the formula 1a

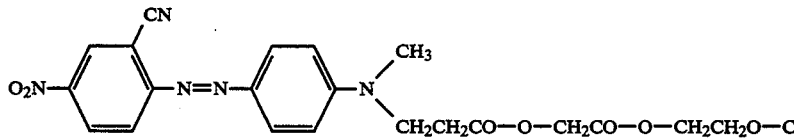

(1a)

This dyestuff can dye polyester material a rubin red colour and has excellent properties, especially good wet fastness properties after thermofixation. This dyestuff is particularly suited for modern Rapid Dyeing processes.

λmax=529 nm (DMF).

EXAMPLE 2

Example 1 is repeated using instead of 35.7 parts of 3-(N-methyl-N-phenylamino)propionic acid-(2'-phenoxyethoxycarbonylmethyl ester), 37.1 parts of 3-(N-ethyl-N-phenylamino)propionic acid (2'-phenoxyethoxycarbonylmethyl ester). The resultant dyestuff is of the formula 2a

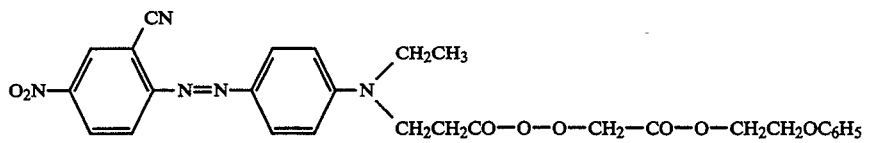

(2a)

This dyestuff dyes polyester a red tone and produces good fastness properties, in particular good wet fastness properties after thermofixation.

λmax=534 nm.(DMF)

EXAMPLE 3

Example 1 is repeated using instead of 35.7 parts of 3(N-methyl-N-phenylamino)propionic acid-(2'-phenoxyethoxycarbonylmethyl ester), 42.9 parts of 3-(N-2'-acetoxyethyl-N-phenylamino) propionic acid (2''-phenoxyethoxycarbonylmethyl ester).

The resultant dyestuff is of the formula 3a

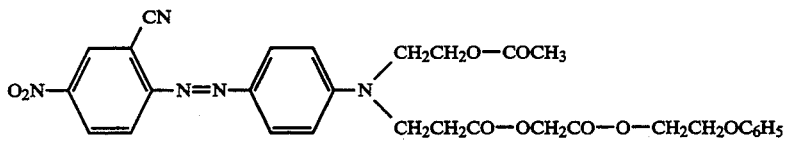

(3a)

This dyestuff dyes polyester a red tone and produces good fastness properties, in particular good wet fastness properties after thermofixation.

λmax=523 nm. (DMF).

EXAMPLE 4

20.7 parts of 1-amino-2,6-dichloro-4-nitrobenzene are stirred into 100 parts of 93% sulphuric acid and then are reacted at 30° C. over 1 hour with 32 parts of 40% nitrosylsulphuric acid. This mixture is stirred a further 2 to 3 hours at this temperature and the resulting diazonium salt solution is added whilst slowly stirring to a mixture of 35,7 parts of 3-(N-methyl-N-phenylamino)-propionic acid-(2'-phenoxyethoxycarbonylmethyl ester), 100 parts of glacial acetic acid, 2 parts of amidosulphonic acid, 200 parts of water and 500 parts of ice.

The resultant precipitated dyestuff is filtered, washed salt free with water and dried under vacuum at 60° C. The resulting dyestuff is of the formula 4a

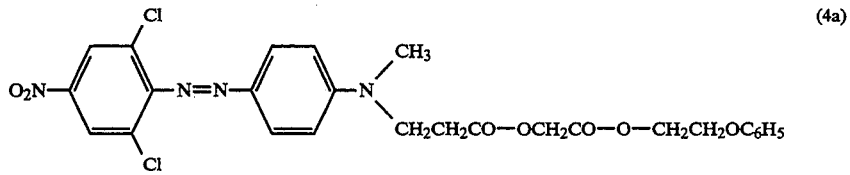

(4a)

This dyestuff can dye polyester material a yellow brown tone with good fastness properties, in particular, good wet fastness properties after thermal fixation.

λ max (DMF)=439 nm.

EXAMPLE 5

21.8 parts of 2-chloro-4,6-dinitroaniline are stirred into 150 parts of 93% sulphuric acid at 15°-20° C. and this is then reacted over 30 minutes with 32 parts of 40% nitrosylsulphuric acid. This is stirred for 2–3 hours and the resultant diazonium salt solution is slowly poured whilst stirring onto a mixture of 46.8 parts of 3-[N-propargyl-N-(5''-acetylamino-2''-methoxyphenylamino)]-propionic acid-(2'-phenoxyethoxycarbonylmethyl ester), 100 parts of glacial acetic acid, 2 parts of amidosulphonic acid, 200 parts of water and 500 parts of ice.

The resultant precipitated dyestuff is filtered, washed salt free with water and dried under vacuum at 60° C. The resulting dyestuff is of the formula 5a

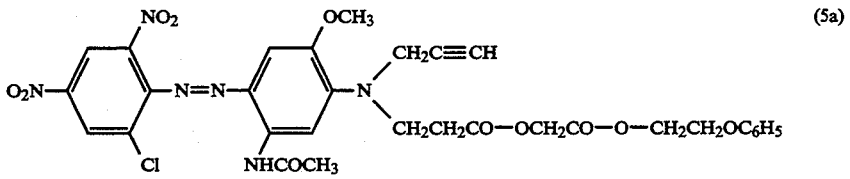

(5a)

This dyestuff can dye polyester material a navy blue colour and has excellent fastness properties, especially fastness properties

EXAMPLE 6

21.8 parts of 2-chloro-4,6-dinitroaniline are stirred into 150 parts of 93% sulphuric acid at 15°-20° C. and this is then reacted over 30 minutes with 32 parts of 40% nitrosylsulphuric acid. This is stirred for 2-3 hours in an ice bath and the resultant diazonium salt solution is slowly poured continuously, whilst stirring onto a mixture of 48,5 parts of 3-(N-allyl-N-(5''-acetylamino-2''-methoxyphenylamino))-propionic acid-(4'-nitro-benzyloxycarbonylmethyl ester), 100 parts of glacial acetic acid, 2 parts of amidosulphonic acid and 300 parts of ice.

The resultant precipitated dyestuff is filtered, washed salt free with water and dried under vacuum at 60° C. The resulting dyestuff is of the formula 6a

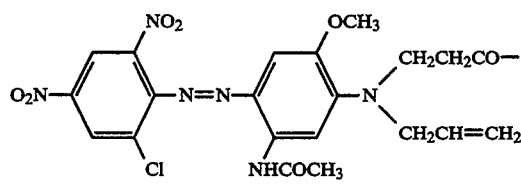

This dyestuff can dye polyester material a navy blue colour and has excellent fastness properties, especially wet fastness properties after thermofixation.

λ max (DMF)=597 nm.

EXAMPLE 7

21.8 parts of 2-chloro-4,6-dinitroaniline are stirred into 150 parts of 93% sulphuric acid at 15°-20° C. and this is then reacted over 30 minutes with 32 parts of 40% nitrosylsulphuric acid. This is stirred for 2-3 hours in an ice bath and the resultant diazonium salt solution is slowly poured continuously, whilst stirring onto a mixture of 40 parts of 3-N-(5''-acetylamino-2''-methoxyphenylamino)-propionic acid-(benzyloxycarbonylmethyl ester), 100 parts of glacial acetic acid, and 300 parts of ice/water.

The resultant precipitated dyestuff is filtered, washed salt free with water and dried under vacuum at 60° C. The resulting dyestuff is of the formula 7a

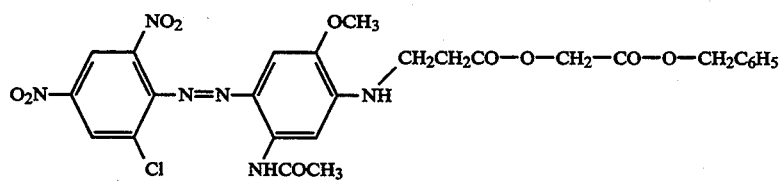

This dyestuff can dye polyester material and polyester/cotton mixed fabrics a navy blue colour and has excellent fastness properties, especially wet fastness properties after thermofixation.

λ max (DMF)=595 nm.

EXAMPLE 8

21.8 parts of 2-chloro-4,6-dinitroaniline are stirred into 150 parts of 93% sulphuric acid at 15°-20° C. and this is then reacted over 30 minutes with 32 parts of 40% nitrosylsulphuric acid. This is stirred for 2-3 hours in an ice bath and the resultant diazonium salt solution is slowly poured continuously, whilst stirring onto a mixture of 44.5 parts of 3-[N-allyl-N-(5''-acetylamino-2''-methoxyphenylamino)]-propionic acid-(2'-methylphenoxycarbonylmethyl)-ester, 100 parts of glacial acetic acid, 2 parts of amidosulphonic acid and 300 parts of ice.

The resultant precipitated dyestuff is filtered, washed salt free with water and dried under vacuum at 60° C. The resulting dyestuff is of the formula 8a

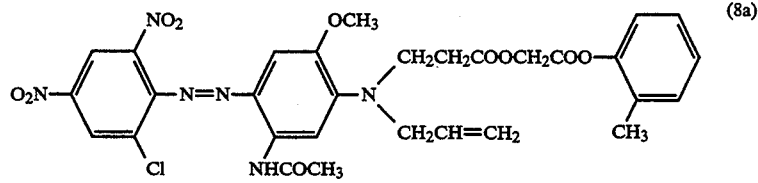

This dyestuff can dye polyester fibre material a navy blue colour and has excellent fastness properties, especially good wet fastness properties after thermofixation.

λ max (DMF)=597 nm.

The compound of formula 8a is particularly suitable for use alone or in a navy blue or black mixture and is particularly suitable for use in rapid dyeing, especially the Foron (registered trademark) RD process.

EXAMPLE 9

16.3 parts of 2-amino-5-nitrobenzonitrile are stirred into 150 parts of 93% sulphuric acid at 15°-0° C. and this is then reacted over 30 minutes at 0 to 5 with 32 parts of 40% nitrosylsulphuric acid. This is stirred for 2-3 hours in an ice bath and the resultant diazonium salt solution is slowly poured continuously, whilst stirring onto a mixture of 34.2 parts of 3-(N-methyl-N-phenylamino)-propionic acid-3',5'-dimethylphenoxycarbonylmethyl ester, 100 parts of glacial acetic acid, 2 parts of amidosulphonic acid and 500 parts of ice/water.

The resultant precipitated dyestuff is filtered, washed salt free with water and dried under vacuum at 60° C. The resulting dyestuff is of the formula 9a then this is reacted at 30° C. over 1 hour with 32 parts of 40% nitrosylsulphuric acid. This mixture is stirred a further 2 to 3 hours at this temperature and the resulting diazonium salt solution is added whilst slowly stirring to a mixture of 44.5 parts of 3-(N-(5''-acetylamino-2''-

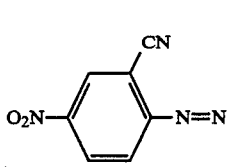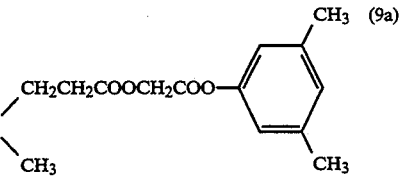

This dyestuff can dye polyester fibre material a rubin colour and has excellent fastness properties λ max (DMF)=532 nm.

The compound of formula 9a is particularly suitable methoxyphenylamino))-propionic acid-n-(4-nitro-benzyloxy-carbonylmethyl ester), 100 parts of glacial acetic acid, 2 parts of amidosulphonic acid and 300 parts of ice.

The resultant precipitated dyestuff is filtered, washed salt free with water and dried under vacuum at 60° C. The resulting dyestuff is of the formula 11a

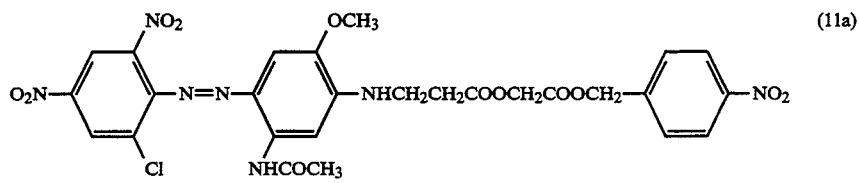

for use alone or in mixture and is particularly suitable for use in rapid dyeing, especially the Foron (registered trademark) RD process. The wet fastness properties are good.

EXAMPLE 10

18.6 parts of 2-amino-4-chloro-3-cyano-5-formyl-thiophene are dissolved in 200 parts of 85% sulphuric acid. Whilst stirring, 33 parts of 40% nitrosyl sulphuric acid are added and stirred for about 3 hours at about 0° C. The resulting brown diazonium salt solution is added whilst stirring well, to a solution of 18 parts of 3-(N-ethyl-N-3''-methylphenylamino)-propionic acid-2'- and 4') respectively) methylphenoxycarbonylmethyl ester and 2 parts of amidosulphonic acid in 50 parts of 5% sulphuric acid. The coupling temperature is maintained by external cooling any by the addition of 200 parts of ice. The dyestuff suspension is stirred for 1 to 2 hours, filtered and washed acid free with 300 parts of water. The product is dried under vacuum at 50° C. An isomeric dyestuff mixture of the formula 10a This dyestuff can dye polyester fibre material a navy blue colour and has excellent fastness properties, especially good wet fastness properties after thermofixation.

λ max (DMF)=595 nm.

The compound of formula 11a is particularly suitable for use alone or in a navy blue or black mixture and is particularly suitable for use in rapid dyeing, especially the Foron (registered trademark) RD process.

EXAMPLE 12

16.3 parts of 2-amino-5-nitrobenzonitrile are stirred into 100 parts of 93% cold sulphuric acid and are then reacted, over 30 minutes with 32 parts of 40% nitrosylsulphuric acid at 0°–5° C.

This is stirred for 3 to 4 hours at 0° to 5° C. and the resultant diazonium solution is poured, whilst stirring well onto a mixture of 40.1 parts of 3-(N-methyl-N-phenylamino)propionic acid-(2''-phenoxyethoxy-2'-ethoxy-carbonylmethyl ester), 100 parts of glacial

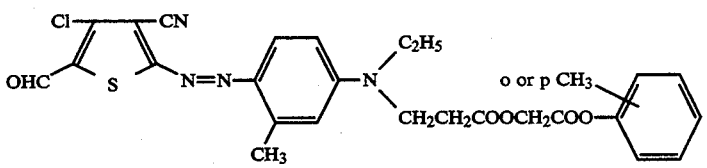

results.

This mixture dyes polyester a brilliant reddish blue tone with good fastness properties. The λ max. (DMF)=610 nm

EXAMPLE 11

21.8 parts of 2-chloro-4,6-dinitroaniline are stirred into 150 parts of 93% sulphuric acid at 15°–20° C. and acetic acid, 2 parts of amidosulphonic acid, 200 parts of water and 500 parts of ice.

The resultant precipitated dyestuff is filtered, washed salt free with water and dried under vacuum at 60° C. The resulting dyestuff is of the formula 12a

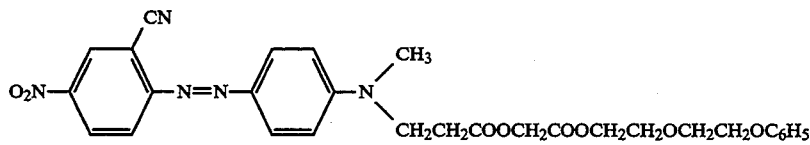

(12a)

This dyestuff can dye polyester material a rubin red colour and has excellent fastness properties, especially good wet fastness properties after thermofixation. This dyestuff is particularly suited for modern Rapid Dyeing processes.

$\lambda_{max} = 531$ nm (DMF).

EXAMPLES 13–433

The compounds of Tables 1 to 17 can be synthesised from known products analogously to an appropriate method according to Example 1-12.

TABLE 1

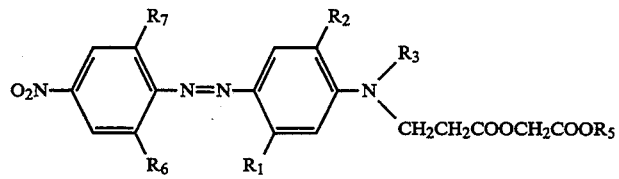

| Ex. No. | $R_6$ | $R_7$ | $R_2$ | $R_1$ | $R_3$ | $R_5$ | Nuance on PES |
|---|---|---|---|---|---|---|---|
| 13 | Cl | —NO$_2$ | —OCH$_3$ | —NHCOCH$_3$ | —CH$_2$CH=CHCl | —C$_6$H$_4$-2-CH$_3$ | blue |
| 14 | Cl | " | —OC$_2$H$_5$ | " | —CH$_2$CH=CH$_2$ | " | " |
| 15 | Cl | " | " | " | —CH$_3$ | —C$_6$H$_4$-2-COOC$_2$H$_5$ | " |
| 16 | Br | " | —OCH$_3$ | —NHCOCH$_3$ | —CH$_2$CH=CH$_2$ | —C$_6$H$_4$-2-COOCH$_3$ | " |
| 17 | Cl | " | " | " | H | —C$_6$H$_3$-2-CH$_3$-4-Cl | " |
| 18 | Cl | " | " | " | —C$_2$H$_4$COOCH$_3$ | —C$_6$H$_4$-4-COOCH$_3$ | " |
| 19 | Cl | " | " | " | —CH$_2$COOC$_2$H$_5$ | —C$_6$H$_4$-4-CH$_3$ | " |
| 20 | Cl | " | " | " | —CH$_2$CH=CH$_2$ | —C$_6$H$_4$-2-CH(CH$_3$)$_2$ | " |
| 21 | Cl | " | " | " | -n-C$_4$H$_9$ | —C$_6$H$_4$-2-CH$_3$ | " |
| 22 | Cl | " | " | " | —CH$_2$CH(CH$_3$)=CH$_2$ | —C$_6$H$_5$ | " |
| 23 | Cl | " | " | " | —CH$_2$CH=CHCl | —C$_6$H$_4$-2-C$_2$H$_5$ | " |
| 24 | Cl | " | " | —NHCOCH$_2$OCH$_3$ | " | —C$_6$H$_3$-2,6-(CH$_3$)$_2$ | " |
| 25 | Cl | " | " | —NHCOCH$_2$OH | —CH$_2$C$_6$H$_5$ | —C$_6$H$_4$-2-CH(CH$_3$)$_2$ | " |
| 26 | Cl | " | " | —NHCOCH$_2$OCOCH$_3$ | —CH$_2$CH=CH$_2$ | —(CH$_2$)$_3$Cl | " |
| 27 | Cl | " | " | CH$_3$ | H | —C$_6$H$_3$-2,6-(CH$_3$)$_2$ | violet |
| 28 | Br | " | " | " | H | " | " |
| 29 | Cl | " | " | —NHCOCH$_3$ | —CH$_2$CHOHCH$_2$Cl | —C$_6$H$_4$-2-CH$_3$ | blue |
| 30 | Cl | " | " | " | —CH$_2$CH(OAc)OAc | —C$_6$H$_4$-2-OCH$_3$ | " |
| 31 | Br | " | " | " | H | —C$_6$H$_4$-2-Allyl | " |
| 32 | Br | " | " | " | —C$_2$H$_4$OCOCH$_3$ | —C$_6$H$_4$-2-CH$_3$ | " |
| 33 | I | " | " | " | " | " | " |
| 34 | Cl | " | " | " | —C$_2$H$_4$OCH$_3$ | —C$_6$H$_4$-2-CH(CH$_3$)$_2$ | " |
| 35 | Cl | " | " | " | H | —C$_6$H$_4$-4-COOC$_4$H$_9$ | " |
| 36 | Cl | " | " | " | —(CH$_2$)$_4$OCOCH$_3$ | —C$_6$H$_4$-2-CH$_3$ | " |
| 37 | Cl | " | " | " | —CH$_2$CH(OAc)CH$_3$ | " | " |
| 38 | Cl | " | " | " | —(CH$_2$)$_3$—2——C$_6$H$_4$-2-C$_2$H$_5$ | " | " |
| 39 | Cl | " | —OC$_2$H$_5$ | —NHCOCH$_3$ | H | —CH$_2$CH$_2$—Cl | " |
| 40 | Cl | " | —OCH$_3$ | —NHCOOC$_2$H$_5$ | H | —(CH$_2$)$_3$—Cl | " |
| 41 | Cl | " | " | —NHCOOCH$_3$ | H | —(CH$_2$)$_4$—Br | " |
| 42 | Cl | " | " | " | H | —(CH$_2$)$_4$—Cl | " |
| 43 | Cl | " | " | " | H | —(CH$_2$)$_3$—C$_6$H$_5$ | " |
| 44 | Cl | " | " | NHCOH | H | —CH$_2$C$_6$H$_5$ | " |
| 45 | Cl | " | " | —NHCOCH=CH$_2$ | H | " | " |
| 46 | Cl | " | " | " | H | —CH$_2$CH$_2$—Cl | " |
| 47 | H | Cl | H | —NHCOCH$_3$ | CH$_2$CH=CH$_2$ | —C$_6$H$_3$-2,6-(CH$_3$)$_2$ | rubin |
| 48 | H | —CN | H | H | " | " | " |
| 49 | H | " | H | H | —C$_2$H$_5$ | —C$_6$H$_4$-2-COCH$_3$ | " |
| 50 | H | " | H | H | —CH$_3$ | —C$_6$H$_4$-2-COC$_2$H$_5$ | " |
| 51 | H | " | H | H | —CH$_2$CH=CHCl | —C$_6$H$_4$-2-CH$_3$ | " |
| 52 | H | Cl | H | —NHCOCH$_3$ | —CH$_2$CH=CH$_2$ | —C$_6$H$_4$-2-C$_2$H$_5$ | red |
| 53 | H | " | H | " | -n-C$_4$H$_9$ | —C$_6$H$_4$-2-COOCH$_3$ | " |
| 54 | H | —COOCH$_3$ | H | H | —CH$_3$ | " | scarlet |
| 55 | H | H | H | —NHCOCH$_3$ | " | —C$_6$H$_4$-2-CH$_3$ | " |
| 56 | Cl | Cl | H | H | " | " | yellow brown |
| 57 | " | " | H | H | " | —C$_6$H$_4$-3-CH$_3$ | " |

TABLE 2

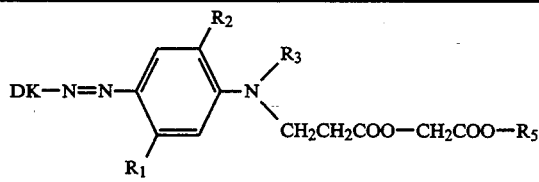

| Example | R₂ | R₁ | R₃ | R₅ | Nuance on PES |
|---|---|---|---|---|---|
| DK = 4-chloro-5-formyl-thiazolyl-2- | | | | | |
| 58 | —OCH₃ | —NHCOCH₂OC₂H₅ | H | —C₆H₃-2,4-(CH₃)₂ | blue |
| 59 | " | —NHCOCH₃ | —CH₂CH=CH₂ | —C₆H₄-2-CH₃ | " |
| 60 | " | —CH₃ | H | " | violet |
| 61 | H | —NHCOCH₃ | —C₂H₅ | —C₆H₄-2-CH(CH₃)₂ | " |
| 62 | H | H | " | —C₆H₄-2-CH₃ | violet |
| 63 | H | H | " | —C₆H₃-2-COOC₂H₅ | " |
| 64 | H | H | —CH₃ | —C₆H₄-2-COC₂H₅ | rubin |
| 65 | H | —OH | —CH₂CH=CH₂ | —C₆H₄-4-CH₃ | " |
| DK = 4-Chlor-5-cyano-thiazolyl-2- | | | | | |
| 66 | H | H | —C₂H₅ | —C₆H₃-2,4-(CH₃)₂ | violet |
| 67 | H | —NHCOCH₃ | " | —C₆H₄-2-CH₃ | blue |
| 68 | —OCH₃ | " | H | —C₆H₄-2-COOCH₃ | " |
| 69 | " | " | H | " | green |
| 70 | H | CH₃ | —C₂H₅ | —C₆H₄-2-C₂H₅ | blue |
| DK = 5-Nitro-thiazolyl-2- | | | | | |
| 71 | —OCH₃ | —NHCOCH₃ | H | —C₆H₃-2,6-(CH₃) | blue |
| 72 | H | " | —C₂H₅ | —C₆H₄-2-OCH₃ | " |
| 73 | H | CH₃ | " | —C₆H₄-2-CH₃ | violet |
| DK = 4-Cyano-3-methyl-isothiazolyl-5- | | | | | |
| 74 | H | H | —CH₃ | —C₆H₄-2-CH₃ | red |
| 75 | H | H | —C₂H₄OCH₃ | —C₆H₃-2,4-(CH₃)₂ | " |
| 76 | H | —NHCOCH₃ | —CH₂C=CH₂ | —C₆H₃-2,3-(CH₃)₂ | " |
| DK = 3-Phenyl-1,2,4-thiadiazolyl-5- | | | | | |
| 77 | H | H | —C₂H₅ | —CH₂CH₂—Br | red |
| 78 | H | —CH₃ | —CH₂CH=CHCH₃ | —C₆H₄-2-CH₃ | " |

| Ex. No. | R₅₀ | R₂ | R₁ | R₃ | R₅ | Nuance on PES |
|---|---|---|---|---|---|---|
| DK = 5-R₅₀mercapto-1,3,4-thiadiazolyl-2- | | | | | | |
| 79 | 5-C₂H₅ | H | —NHCOCH₃ | —C₂H₅ | —C₂H₃-2,4-(CH₃)₂ | red |
| 80 | 5-CH₂C₆H₅ | " | " | " | —CH₂C₆H₅ | " |
| DK = Benzthiazolyl-2-substituted by R₅₀ | | | | | | |
| 81 | (5),6,(7)—Cl | H | —CH₃ | —CH₃ | —C₆H₄-2-CH(CH₃)₂ | red |
| 82 | 6-NO₂ | H | " | —C₂H₅ | —C₆H₄-2-CH₃ | " |
| DK = 5-Nitro-2,1-Benzisothiazolyl-3- | | | | | | |
| 83 | | H | —NHCOCH₃ | —C₂H₄OCH₃ | —CH₂CH₂Cl | green blue |
| 84 | | H | H | —C₂H₅ | —C₆H₄-2-CH₃ | blue |
| DK = 4-Chloro-3-cyano-5-formyl-thienyl-2- | | | | | | |
| 85 | | —OCH₃ | —NHCOCH₃ | H | —C₆H₃-2,4-(CH₃)₂ | green blue |
| 86 | | " | —NHCOCH₂OCH₃ | H | " | " |
| 87 | | " | —NHCOCH₃ | —CH₂CH=CH₂ | —C₆H₄-2-CH₃ | " |
| 88 | | H | " | —C₂H₅ | " | blue |
| 89 | | H | —NHCOCH₂OCH₃ | " | " | " |
| 90 | | —OCH₃ | —CH₃ | H | " | " |
| 91 | | H | " | —C₂H₅ | " | red blue |
| DK = 4-(substituierte)-3,5-dicyano-thienyl-2- | | | | | | |
| 92 | 4-Cl | H | —CH₃ | —C₂H₅ | —C₆H₄-2-CH₃ | red blue |
| 93 | " | H | —NHCOCH=CH₂ | " | " | blue |
| 94 | " | —OC₂H₅ | —NHCOC₂H₄Cl | H | —C₆H₄-4-COOCH₃ | blue |
| 95 | " | H | —CH₃ | —C₂H₅ | —C₆H₃-2,4-(CH₃)₂ | red blue |
| 96 | 4-CH₃ | H | " | " | —C₆H₃-4-Cl-3-CH₃ | violet |
| 97 | " | " | H | " | —C₆H₄-2-Allyl | rubin |
| DK = 3-Cyano-5-nitro-thienyl-2- | | | | | | |
| 98 | | H | —CH₃ | —C₂H₅ | —(CH₂)₃—Cl | blue |
| 99 | | H | " | " | —C₆H₃-2,6-(CH₃)₂ | " |
| 100 | | H | —NHCOCH₃ | " | —CH₂C₆H₅ | " |
| DK = 3,5-Dinitro-thienyl-2- | | | | | | |
| 101 | | H | —NHCOCH₃ | —C₂H₅ | —C₆H₄-2-CH₃ | green |
| 102 | | H | —CH₃ | " | —C₆H₄-2-CH₃ | blue |
| 103 | | H | H | " | —C₆H₄-2-COOC₂H₅ | " |
| DK = 3-Acetyl-5-nitro-thienyl-2- | | | | | | |
| 104 | | H | —CH₃ | —C₂H₅ | —C₆H₃-2,6-(CH₃)₂ | blue |
| 105 | | H | " | -n-C₄H₉ | —CH₂C₆H₅ | " |
| DK = 3-Alkoxycarbonyl-5-nitro-thienyl-2- | | | | | | |
| 106 | | H | —CH₃ | —C₂H₅ | CH₂CH₂CHCl—CH₃ | red blue |
| 107 | | H | " | " | —C₆H₄-2-CH₃ | " |

TABLE 2-continued

| | | | | | | |
|---|---|---|---|---|---|---|
| DK = 3-Cyano-5-(substituted)phenylazo-thienyl-2- | | | | | | |
| 108 | (4'-H) | H | H | $-C_2H_5$ | $-C_6H_4$-2-$CH_3$ | red blue |
| 109 | " | H | H | $-C_2H_4OCOCH_3$ | $-C_6H_4$-2-$CH(CH_3)_2$ | " |
| PYRAZOLE/IMIDAZOLE/TRIAZOLE: | | | | | | |
| DK = 4-Cyano-3-methyl-1-phenyl-pyrazolyl-5- | | | | | | |
| 110 | | H | $-NHCOCH_3$ | $-C_2H_5$ | $-C_6H_4$-2-$CH_3$ | red |
| 111 | | H | $-CH_3$ | $-C_2H_4OCH_3$ | $-C_6H_4$-2-$COOCH_3$ | scarlet. |
| DK = 1-Cyanomethyl-4,5-dicyano-imidazolyl-2- | | | | | | |
| 112 | | H | $-CH_3$ | -n-$C_6H_{13}$ | $-C_6H_4$-2-$CH_3$ | red |
| 113 | | H | " | $-C_2H_5$ | $-C_6H_3$-2,4-$(CH_3)_2$ | " |
| DK = 4-Cyano-1(substituted $R_{50}$)1,2,3-triazolyl-5- | | | | | | |
| 114 | (1-Allyl) | H | $-NHCOCH_3$ | $-C_2H_4OCH_3$ | $-C_6H_4$-2-$CH_3$ | red |
| 115 | (1-Benzyl) | H | $-NHCOCH_2OCH_3$ | $-CH_2CH=CH_2$ | $-CH_2CH_2$-Cl | " |

The dyestuffs of the following formula

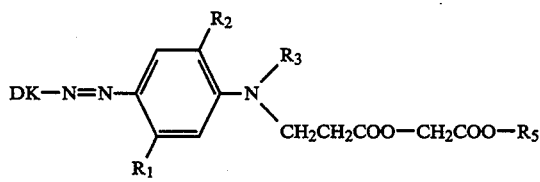

in which the symbols are defined in Table 3 can be made from known compounds by an appropriate method of Examples 1 to 12.

in which the symbols are defined in Table 4 can be prepared from known compounds by an appropriate method of Example 1 to 12.

TABLE 4

| Ex. No. | $R_6$ | $R_7$ | $R_3$ | $R_4$ | Nuance on PES |
|---|---|---|---|---|---|
| 131 | $-CN$ | H | $-C_2H_5$ | H | Rubine |
| 132 | Cl | Cl | $-CH_3$ | H | yellow brown |
| 133 | $-CN$ | H | $-CH_2CH_2O-CO-OCH_3$ | H | Red |
| 134 | " | H | $-CH_2CH_2O-COCH_3$ | H | " |
| 135 | Cl | Cl | $-CH_3$ | $-CH_3$ | yellow brown |

TABLE 3

| Ex. No. | $R_2$ | $R_1$ | $R_3$ | $R_5$ | Nuance on PES |
|---|---|---|---|---|---|
| DK = 2,4-Dinitro-5-rhodano-phenyl-1- | | | | | |
| 116 | $-OC_2H_5$ | $-NHCOCH_2OCH_3$ | H | $-CH_2CH_2$-Cl | green blue |
| 117 | $-OCH_3$ | $CH_3$ | H | $-C_6H_4$-2-$CH_3$ | blue |
| 118 | H | $-NHCOCH_3$ | $-C_2H_5$ | $-C_6H_4$-2-$OCH_3$ | " |
| 119 | H | $CH_3$ | " | " | " |
| 120 | H | H | " | $-C_6H_4$-4-$COOC_2H_5$ | red blue |
| DK = 2,4-Dinitro-5-chloro-phenyl-1- | | | | | |
| 121 | $-OCH_3$ | $-NHCOCH_3$ | H | $-C_6H_4$-2-$CH(CH_3)_2$ | blue |
| 122 | " | $-NHCOC_2H_5$ | H | $-C_6H_4$-2-$CH_3$ | " |
| 123 | " | $-NHCOOCH_3$ | $-CH_2CH=CH_2$ | $-C_6H_4$-4-$CH_3$ | " |
| DK = 2,4-Dinitro-5,6-dichloro-phenyl-1- | | | | | |
| 124 | " | $-NHCOCH_3$ | $-(CH_2)_3CN$ | $-CH_2CH_2$-Cl | blue |
| 125 | " | " | H | $-C_6H_4$-4-$COOCH_3$ | " |
| DK = 2,6-Dicyano-4-methyl-phenyl-1- | | | | | |
| 126 | H | $-NHSO_2CH_3$ | $-C_2H_5$ | $-(CH_2)_3$-Cl | red |
| 127 | H | " | " | $-C_6H_4$-2-$CH_3$ | " |
| 128 | H | $-CH_3$ | " | " | " |
| DK = 2,6-Dicyano-4-bromo-phenyl-1- | | | | | |
| 129 | H | OH | $-CH_2CH=CH_2$ | $-C_6H_3$-2-$CH_3$ | red |
| 130 | H | " | $-C_2H_5$ | $-C_6H_3$-2,4-$(CH_3)_2$ | " |

Compounds of the formula

Compounds of the formula

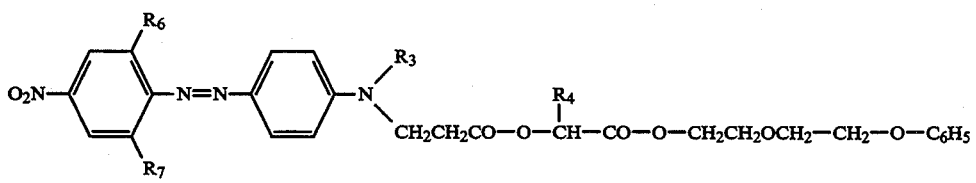

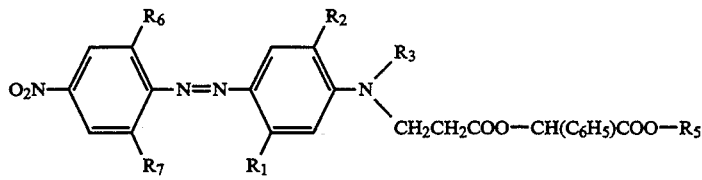

in which the symbols are defined in Table 5 can be prepared from known compounds by an appropriate method of Example 1 to 12.

Compounds of the formula

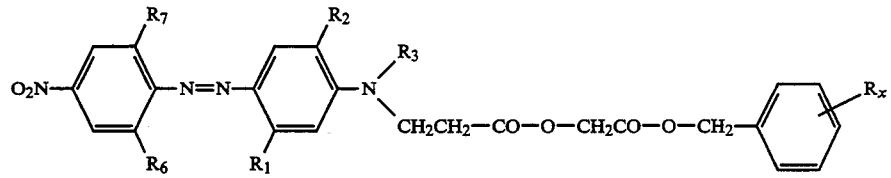

in which the symbols are defined in Table 6 can be prepared from known compounds by an appropriate method of Example 1 to 12.

TABLE 5

| Ex. No. | $R_7$ | $R_6$ | $R_2$ | $R_1$ | $R_3$ | $R_5$ | Nuance on PES |
|---|---|---|---|---|---|---|---|
| 136 | Cl | —NO$_2$ | —OCH$_3$ | —NHCOCH$_3$ | H | —CH$_3$ | blue |
| 137 | Cl | " | " | " | H | —C$_2$H$_5$ | " |
| 138 | Cl | " | " | " | H | —C$_4$H$_9$-n | " |
| 139 | H | —CN | H | H | —CH$_3$ | —C$_2$H$_5$ | rubin |
| 140 | Cl | Cl | H | H | " | " | yellow brown |

TABLE 6

| Ex. No | $R_6$ | $R_7$ | $R_1$ | $R_2$ | $R_3$ | $R_x$ | Nuance on PES |
|---|---|---|---|---|---|---|---|
| 141 | —NO$_2$ | Br | —NHCOCH$_3$ | H | —C$_2$H$_5$ | H | violet |
| 142 | " | Cl | " | H | —C$_4$H$_9$ | H | " |
| 143 | " | " | " | H | —(CH$_2$)$_4$OCOCH$_3$ | H | " |
| 144 | " | " | —CH$_3$ | OCH$_3$ | —CH$_3$ | H | " |
| 145 | " | " | " | " | —C$_2$H$_4$OCOCH$_3$ | H | " |
| 146 | " | " | " | " | H | H | " |
| 147 | " | " | " | " | H | 4-NO$_2$ | " |
| 148 | " | Br | " | " | H | H | " |
| 149 | " | H | —NHCOCH$_3$ | H | —CH$_2$CH=CH—Cl | H | ruby red |
| 150 | " | H | " | H | —CH$_2$CH=CH$_2$ | H | " |
| 151 | " | H | H | H | —CH$_3$ | H | " |
| 152 | —CN | H | H | H | —C$_2$H$_5$ | H | " |
| 153 | " | H | H | H | —CH$_2$CH=CH$_2$ | H | " |
| 154 | —CN | H | H | H | —CH$_3$ | H | ruby red |
| 155 | " | H | —NHCOCH$_3$ | H | —CH$_2$CH=CH$_2$ | H | " |
| 156 | " | H | —NHCOC$_2$H$_5$ | H | —C$_2$H$_4$OCH$_3$ | H | " |
| 157 | Cl | H | —NHCOCH$_3$ | H | —C$_2$H$_5$ | H | red |
| 158 | H | H | H | H | —C$_2$H$_4$OCOC$_2$H$_5$ | H | scarlet |
| 159 | Cl | Cl | H | H | —CH$_3$ | H | yellow brown |
| 160 | " | " | H | H | —C$_2$H$_5$ | H | " |
| 161 | —NO$_2$ | Cl | —NHCOCH$_3$ | —OCH$_3$ | —CH$_2$C≡CH | H | navy blue |
| 162 | " | " | " | " | " | 4-NO$_2$ | " |
| 163 | " | Br | " | " | H | " | " |
| 164 | " | " | —NH-COOCH$_3$ | —OC$_2$H$_5$ | | H | " |
| 165 | " | " | " | —OCH$_3$ | H | 4-NO$_2$ | " |
| 166 | " | " | " | " | —CH$_2$C≡CH | " | " |
| 167 | " | Cl | —NHCOCH$_3$ | " | —CH$_2$COOCH$_3$ | H | " |
| 168 | " | " | " | " | —CH$_2$COOCH$_2$C≡CH | H | " |
| 169 | " | " | —NHCOC$_2$H$_5$ | " | H | H | " |
| 170 | " | " | —NH-COOCH$_3$ | " | H | H | " |
| 171 | " | " | —NH-COOCH$_3$ | " | H | 4-Cl | " |
| 172 | " | " | —NH-COCH=CH$_2$ | " | H | H | " |
| 173 | " | " | —NHCOCH$_3$ | " | —CH$_2$CH=CH—Cl | H | " |
| 174 | " | " | " | —OC$_2$H$_5$ | —C$_2$H$_4$COOCH$_3$ | H | " |
| 175 | " | " | " | " | —(CH$_2$)$_3$CN | H | " |
| 176 | " | " | " | —OCH$_3$ | —C$_2$H$_4$OCOCH$_3$ | H | " |

TABLE 6-continued

| Ex. No | R$_6$ | R$_7$ | R$_1$ | R$_2$ | R$_3$ | R$_x$ | Nuance on PES |
|---|---|---|---|---|---|---|---|
| 177 | " | " | " | " | —C$_2$H$_4$COOCH$_2$C≡CH | H | " |
| 178 | " | " | " | " | —CH$_2$COOC$_6$H$_5$ | H | " |
| 179 | " | " | " | " | —C$_2$H$_4$OCH$_3$ | 4-CH$_3$ | " |
| 180 | " | " | " | —OC$_2$H$_5$—CH$_2$C≡CH | | 4-NO$_2$ | " |

Compounds of the formula

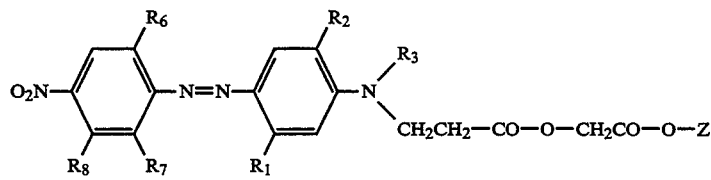

in which the symbols are defined in Table 7 can be prepared from known compounds by an appropriate method of Example 1 to 12.

Compounds of the formula

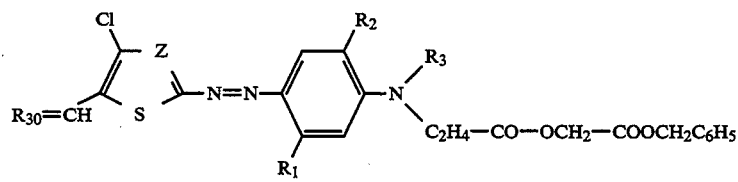

in which the symbols are defined in Table 8 can be prepared from known compounds by an appropriate method of Example 1 to 10.

TABLE 7

| Ex. No. | R$_8$ | R$_6$ | R$_7$ | R$_1$ | R$_2$ | R$_3$ | Z | Nuance on PES |
|---|---|---|---|---|---|---|---|---|
| 181 | H | —NO$_2$ | Cl | —NHCOCH$_3$ | —OCH$_3$ | H | —CH$_2$—⟨tetrahydrofuran⟩ | navy blue |
| 182 | H | " | Br | " | " | H | " | " |
| 183 | H | " | Cl | " | " | —CH$_2$C≡CH | " | " |
| 184 | H | " | " | " | —OC$_2$H$_5$ | —CH$_2$COOCH$_3$ | " | " |
| 185 | H | " | " | —NHCOC$_2$H$_5$ | —OCH$_3$ | H | " | " |
| 186 | H | " | " | —CH$_3$ | " | H | " | violet |
| 187 | H | CN | H | H | H | —C$_2$H$_5$ | " | ruby red |
| 188 | H | " | H | H | H | —CH$_2$CH=CH$_2$ | " | " |
| 189 | H | Cl | Cl | H | H | —CH$_3$ | " | yellow brown |
| 190 | H | " | " | H | H | —C$_2$H$_5$ | " | yellow brown |
| 191 | H | —NO$_2$ | " | —NHCOCH$_3$ | —OCH$_3$ | H | —C$_2$H$_4$—C$_6$H$_5$ | navy blue |
| 192 | H | " | Br | " | " | H | " | " |
| 193 | H | " | Cl | " | " | —CH$_2$C≡CH | " | " |
| 194 | H | " | " | " | " | —CH$_2$CHOHCH$_2$—Cl | " | " |
| 195 | H | " | " | —NHCOCH$_3$ | " | H | —(CH$_2$)$_3$—C$_6$H$_5$ | " |
| 196 | H | " | " | —NHCHO | " | H | " | " |
| 197 | H | " | Br | —NHCOCH$_3$ | " | H | " | " |
| 198 | Cl | " | Cl | " | " | H | —CH$_2$—C$_6$H$_5$ | " |
| 199 | Cl | " | " | " | " | —CH$_2$C≡CH | " | " |
| 200 | Cl | " | " | H | " | —CH$_2$CH=CH$_2$ | " | " |

| Ex. No. | R$_{30}$ | Z | R$_1$ | R$_2$ | R$_3$ | Nuance on PES |
|---|---|---|---|---|---|---|
| 201 | O | =C—CN | —CH$_3$ | H | —C$_2$H$_5$ | blue |
| 202 | O | " | " | H | —C$_4$H$_9$ | " |
| 203 | =CH—NO$_2$ | " | " | H | —C$_2$H$_5$ | green blue |
| 204 | =C(CN)—COOC$_2$H$_5$ =C(CN)—COOC$_4$H$_9$(n) (1:1 ratio) | " | " | H | " | " |
| 205 | O | " | " | —NHCOCH$_3$ | H | " | blue |
| 206 | O | =N— | " | —CH$_3$ | H | " | violet |
| 207 | O | " | " | —NHCOCH$_3$ | —OCH$_3$ | H | navy blue |

-continued

| Ex. No. | R30 | Z | R1 | R2 | R3 | Nuance on PES |
|---|---|---|---|---|---|---|
| 208 | O | " | " | " | —CH2—CH=CH2 | " |
| 209 | O | " | " | " | —CH2—CH=CH- | " |
| 210 | O | " | " | —OC2H5 | H | " |
| 211 | O | " | " | " | —CH2—CH=CH2 | " |
| 212 | O | " | " | " | —CH2C≡CH | " |
| 213 | O2N—CH= | " | —CH3 | H | —C2H5 | blue |
| 214 | NC\C=/COOC4H9(n) | " | " | H | " | " |
| 215 | NC\C=/COOC2H5 | " | " | —OCH3 | H | green blue |

Compounds of the formula

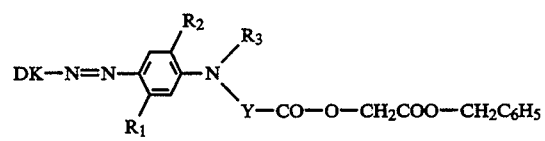

in which the symbols are defined in Table 9 can be prepared from known compounds by an appropriate method of Example 1 to 12.

TABLE 9

| Ex. No. | DK | R1 | R2 | Y | R3 | Nuance on PES |
|---|---|---|---|---|---|---|
| 216 | 2-CN, 5-O2N-phenyl | H | H | —C3H6 | —CH3 | rubin |
| 217 | " | H | H | —CH2—CH(CH3)— | " | " |
| 218 | 2-NO2, 4-O2N, 5-Br-phenyl | —NHCOCH3 | —OCH3 | " | H | navy blue |
| 219 | 2-NO2, 4-O2N, 5-Cl-phenyl | " | —OC2H5 | " | " | " |
| 220 | (CH3)2CH—S—C(=N—N=C(CH3))—S | —CH3 | H | " | —C2H5 | scarlet red |

TABLE 10
| Example No. | Structure | Nuance on PES |
|---|---|---|
| 221 | 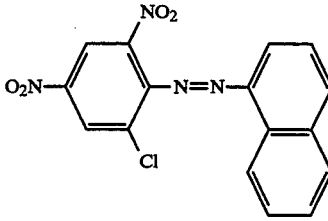 | navy blue |
| 222 | 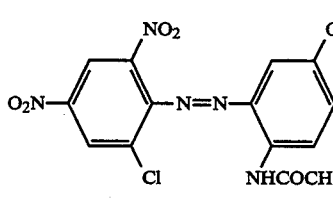 | navy blue |
| 223 | 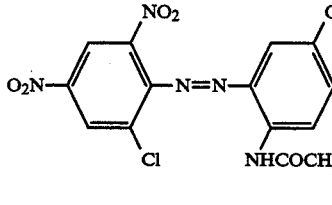 | navy blue |
| 224 | 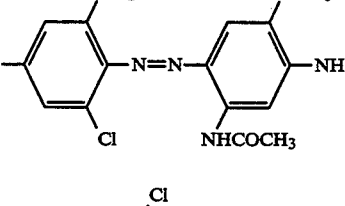 | navy blue |
| 225 | 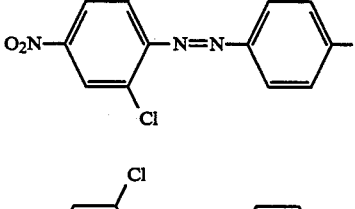 | yellow brown |
| 226 | 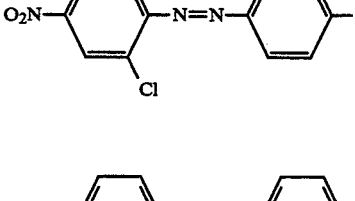 | yellow brown |
| 227 | 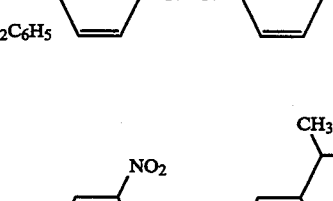 | yellow |
| 228 | 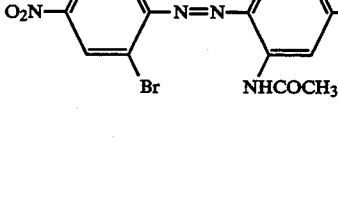 | navy blue |

TABLE 10-continued

| Example No. | Structure | Nuance on PES |
|---|---|---|
| 229 | (Cl)(CN)-substituted thiophene with CHO, S; —N=N— to phenyl bearing CH(CH₃)CH₂C(CH₃)₃, CH₃, and N(CH₂CH₂CO—OCH₂COO-phenyl-CH₃) | blue |
| 230 | 2,4-dinitro-6-bromo-phenyl—N=N—phenyl[CH(CH₃)CH₂C(CH₃)₃][NHCOC₂H₅][N(CH₂CH₂CO—OCH₂COO—CH₂CH=CH—Cl)] | blue |
| 231 | 2-CN-4-NO₂-6-Cl-phenyl—N=N—naphthyl—NH—C₂H₄—COOCH₂—COO-(4-COOCH₃-phenyl) | blue |
| 232 | 2,4-dinitro-6-bromo-phenyl—N=N—phenyl[CH(CH₃)CH₂C(CH₃)₃][NHCOCH₃][N(CH₂CH₂CO—OCH₂COOCH₂CH=CH₂)] | navy blue |
| 233 | (Cl)(CN)-substituted thiophene with CHO, S; —N=N— to phenyl[CH(CH₃)CH₂C(CH₃)₃][NHCOCH₃][N(CH₂CH₂CO—OCH₂COOCH₂CH=CH—Cl)] | blue |
| 234 | 2,4-dinitro-6-CN-phenyl—N=N—phenyl[CH(CH₃)CH₂C(CH₃)₃][NHCOC₂H₅][N(CH₂CH₂CO—OCH₂COOCH₂CF₃)] | blue |
| 235 | 2-CN-4-NO₂-6-Br-phenyl—N=N—quinolinyl—NH—C₂H₄COOCH₂COOCH₂C₆H₅ | blue |

Compounds of the formula
TABLE 10-continued

| Example No. | Structure | Nuance on PES |
|---|---|---|
| 236 | 2,4-dinitro-6-chlorophenyl-azo coupled to aniline with NHCOCH$_3$, 1,1,3,3-tetramethylbutyl, and N(CH$_2$CH$_2$CO—OCH$_2$COOCH$_2$-tetrahydrofuran-2-yl) substituents | navy blue |
| 237 | 3-chloro-4-cyano-5-formyl-thiophen-2-yl-azo coupled to methyl/1,1,3,3-tetramethylbutyl aniline with N(CH$_2$CH$_2$CO—OCH$_2$COOCH$_2$-C$_6$H$_4$-4-NO$_2$) | greenish blue |
| 238 | 2,4-dinitro-6-cyanophenyl-azo coupled to aniline with NHCOC$_2$H$_5$, 1,1,3,3-tetramethylbutyl, and N(CH$_2$CH$_2$CO—OCH$_2$COOCH$_2$C$_6$H$_5$) substituents | blue |
| 239 | 2-cyano-4-nitro-6-bromophenyl-azo coupled to 8-amino-quinolin-5-yl with NHCH$_2$CH$_2$CO—O—CH$_2$CO—O—CH$_2$CH$_2$—OC$_6$H$_5$ | blue |
| 240 | 2-cyano-4-nitro-6-chlorophenyl-azo coupled to 2-methylquinolin-8-yl-amino with NHCH$_2$CH$_2$COOCH$_2$COOCH$_2$CH$_2$OC$_6$H$_5$ | navy blue |
| 241 | 3-chloro-4-cyano-5-formyl-thiophen-2-yl-azo coupled to methyl/1,1,3,3-tetramethylbutyl aniline with N(CH$_2$CH$_2$COOCH$_2$COOCH$_2$CH$_2$OC$_6$H$_5$) | greenish blue |
| 242 | 2,4-dinitro-6-cyanophenyl-azo coupled to aniline with NHCOC$_2$H$_5$, 1,1,3,3-tetramethylbutyl, and N(CH$_2$CH$_2$CO—OCH$_2$COO—CH$_2$CH$_2$—OC$_6$H$_5$) substituents | blue |

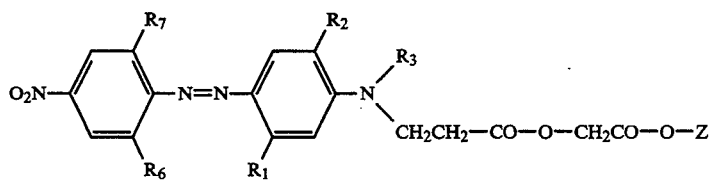

in which the symbols are defined in Table 11 can be prepared from known compounds by an appropriate method of Example 1 to 12.

TABLE 11

| Ex. No. | R$_6$ | R$_7$ | R$_1$ | R$_2$ | R$_3$ | Z | Nuance on PES |
|---|---|---|---|---|---|---|---|
| 243 | —CN | H | H | H | —CH$_3$ | —CH$_2$CH=CH | ruby red |
| 244 | " | H | H | H | " | —CH$_2$CH=CH—Cl | " |
| 245 | " | H | H | H | " | —CH$_2$C≡CH | " |
| 246 | " | H | H | H | " | —CH$_2$CH$_2$Br | " |
| 247 | " | H | H | H | " | —CH$_2$CH$_2$Cl | " |
| 248 | " | H | H | H | " | —CH$_2$-(tetrahydrofuran-2-yl) | " |
| 249 | " | H | H | H | " | (tetrahydropyran-2-yl) | " |
| 250 | " | H | H | H | n-C$_4$H$_9$ | —C$_6$H$_5$ | " |
| 251 | —CN | H | H | H | —CH$_3$ | m-tolyl (3-CH$_3$-C$_6$H$_4$—) | ruby red |
| 252 | " | H | H | H | —C$_2$H$_5$ | " | " |
| 253 | " | H | H | H | —CH$_3$ | p-tolyl (4-CH$_3$-C$_6$H$_4$—) | " |
| 254 | " | H | H | H | " | o-tolyl (2-CH$_3$-C$_6$H$_4$—) | " |
| 255 | " | H | H | H | " | 2,4-(CH$_3$)$_2$-C$_6$H$_3$— | " |
| 256 | " | H | H | H | " | 4-OCH$_3$-C$_6$H$_4$— | " |
| 257 | " | H | H | H | —CH$_3$ | 3-OCH$_3$-C$_6$H$_4$— | ruby red |

TABLE 11-continued

| Ex. No. | R₆ | R₇ | R₁ | R₂ | R₃ | Z | Nuance on PES |
|---|---|---|---|---|---|---|---|
| 258 | " | H | H | H | " | 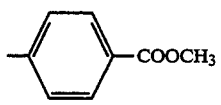 | " |
| 259 | " | H | H | H | " |  | " |
| 260 | " | H | H | H | " | 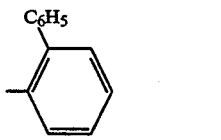 | " |
| 261 | —NO₂ | Cl | —NHCOCH₃ | —OCH₃ | H | —CH₂CH=CH₂ | navy blue |
| 262 | " | Cl | " | " | —CH₂CH=CH₂ | " | " |
| 263 | " | Br | " | —OC₂H₅ | " | —CH₂CH=CH—Cl | " |
| 264 | " | Cl | " | " | H | " | " |
| 265 | " | Cl | " | —OCH₃ | H | —CH₂C≡CH | " |
| 266 | " | Br | —NHCOC₂H₅ | " | —CH₂CH=CH—Cl | " | " |
| 267 | " | Cl | —NHCOC₂H₅ | " | H | —CH₂CH₂Cl | " |
| 268 | " | Cl | —NHCOCH₃ | " | —CH₂CH=CH₂ | " | " |
| 269 | " | Cl | —NHCOCH₃ | —OC₂H₅ | —CH₂CH=CH₂ | " | navy blue |
| 270 | " | Cl | " | —OCH₃ | H | " | " |
| 271 | —NO₂ | Cl | —NHCOCH₃ | —OC₂H₅ | H | 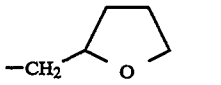 | " |
| 272 | " | " | " | " | —CH₂C≡CH | " | " |
| 273 | " | " | " | " | H | " | " |
| 274 | " | Br | " | —OCH₃ | H | C₆H₅ | " |
| 275 | " | Br | —NHCOCH=CH₂ | " | —CH₂CH=CH₂ | " | " |
| 276 | " | Cl | " | " | H | 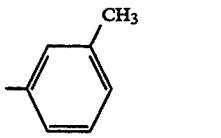 | " |
| 277 | —NO₂ | Cl | —NHCOCH₃ | " | —CH₂CH=CH₂ | 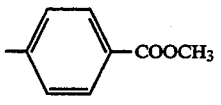 | " |
| 278 | " | Cl | " | —OC₂H₅ | H |  | " |
| 279 | " | Cl | " | —OCH₃ | —CH₂CH=CH—Cl | —CH₂CH₂Cl | " |
| 280 | " | Cl | " | " | —CH₂CH=CH₂ | 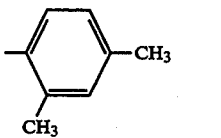 | " |
| 281 | Cl | Cl | H | H | —CH₃ | —CH₂CH=CH₂ | yellow brown |
| 282 | Cl | Cl | H | H | " | —CH₂CH=CH—Cl | " |
| 283 | Cl | Cl | H | H | " | —CH₂C≡CH | " |

TABLE 11-continued

| Ex. No. | R₆ | R₇ | R₁ | R₂ | R₃ | Z | Nuance on PES |
|---|---|---|---|---|---|---|---|
| 284 | Cl | Cl | H | H | " | 2,5-dimethylphenyl | " |
| 285 | Cl | Cl | H | H | " | —CH₂-(tetrahydrofuran-2-yl) | " |
| 286 | Cl | Br | H | H | —CH₂CH₃ | " | " |
| 287 | Cl | Cl | H | H | —CH₃ | —C₆H₅ | yellow brown |
| 288 | Cl | Cl | H | H | —CH₂CH₃ | 3-methylphenyl | " |
| 289 | Cl | Cl | H | H | —CH₂CH=CH₂ | 4-methylphenyl | " |
| 290 | Cl | Cl | H | H | —CH₃ | 4-methoxyphenyl | " |
| 291 | Cl | Cl | H | H | " | 2,3-dimethylphenyl | " |
| 292 | Cl | Cl | H | H | " | 4-(COOCH₃)phenyl | " |
| 293 | Cl | Cl | H | H | " | 2-(COOCH₃)phenyl | " |
| 294 | —NO₂ | Br | —NHCOCH₃ | H | —CH₂CH₃ | " | violet |
| 295 | " | Cl | " | H | " | —CH₂CH=CH₂ | " |
| 296 | —CN | —CN | —CH₃ | H | —C₃H₇ | —CH₂CH=CH₂ | blue |
| 297 | NO₂ | " | " | H | —C₄H₉ | 3-methylphenyl | " |
| 298 | " | H | —NHCOCH=CH₂ | H | CH₃ | —CH₂CH=CH₂ | ruby red |

Compounds of the formula

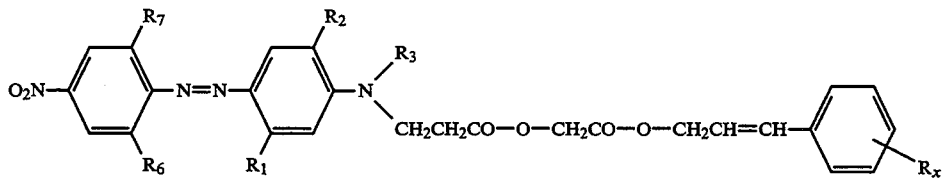

in which the symbols are defined in Table 12 can be prepared from known compounds by an appropriate method of Example 1 to 12.

in which the symbols are defined in Table 13 can be prepared from known compounds by an appropriate method of Example 1 to 12.

TABLE 12

| Ex No | $R_6$ | $R_7$ | $R_1$ | $R_2$ | $R_3$ | $R_x$ | Nuance on PES |
|---|---|---|---|---|---|---|---|
| 299 | —CN | H | H | H | $CH_3$ | H | ruby red |
| 300 | " | H | H | H | —$CH_2CH_3$ | H | " |
| 301 | " | H | H | H | —$CH_2CH=CH_2$ | H | " |
| 302 | " | H | H | H | —$CH_3$ | 4-$NO_2$ | " |
| 303 | —$NO_2$ | H | —$NHCOCH_3$ | H | —$CH_2CH=CH_2$ | H | " |
| 304 | " | H | —$NHCOC_2H_5$ | H | —$CH_2C\equiv CH$ | H | " |
| 305 | " | H | —$NHCOCH=CH_2$ | H | —$CH_2CH=CH_2$ | H | " |
| 306 | " | Cl | —$NHCOCH_3$ | —$OCH_3$ | H | H | navy blue |
| 307 | " | Br | " | " | H | H | " |
| 308 | " | Cl | " | $OCH_2CH_3$ | H | H | " |
| 309 | " | Cl | " | —$OCH_3$ | —$CH_2CH=CH_2$ | H | " |
| 310 | " | Cl | " | " | —$CH_2CH=CHCl$ | H | " |
| 311 | " | Cl | —$NHCOCH_2CH_3$ | " | H | H | " |
| 312 | " | Cl | —NHCO—$OCH_3$ | " | —$CH_2CH=CH_2$ | H | " |
| 313 | " | Cl | —$NHCOCH_3$ | " | H | 4-$NO_2$ | " |
| 314 | " | Br | " | " | —$CH_2CH=CH_2$ | H | " |
| 315 | " | Br | " | " | —$CHC\equiv CH$ | H | " |
| 316 | " | Cl | " | " | " | H | " |
| 317 | Cl | Cl | H | H | —$CH_3$ | H | yellow brown |
| 318 | Cl | Cl | H | H | " | 4-$NO_2$ | " |

TABLE 13

| Ex. No. | $R_6$ | $R_7$ | $R_3$ | $R_4$ | $R_5$ | Nuance Polyester |
|---|---|---|---|---|---|---|
| 319 | Cl | Cl | —$CH_3$ | H | —$CH_3$ | yellow brown |
| 320 | Cl | Cl | —$CH_3$ | —$CH_3$ | H | " |
| 321 | Br | Br | —$CH_3$ | H | H | " |
| 322 | —CN | H | —$CH_2C_6H_5$ | H | H | ruby red |
| 323 | " | H | —$CH_2CH_2$—$C_6H_5$ | H | H | " |
| 324 | " | H | —$CH_2CH_2OC_6H_5$ | H | H | " |
| 325 | " | H | —$CH_2CH_2O$—CO—$OCH_3$ | H | H | bluish red |
| 326 | " | H | —$CH_2CH=CH_2$ | H | H | ruby red |
| 327 | Cl | Cl | —$CH_2CH_3$ | H | H | yellow brown |
| 328 | —CN | H | —$CH_2C\equiv CH$ | H | H | ruby red |
| 329 | " | H | —$CH_3$ | H | —$CH_3$ | " |
| 330 | " | H | —$CH_2CH_2OCOOC_2H_5$ | H | H | " |
| 331 | Br | Cl | —$CH_3$ | H | H | yellow brown |

Compounds of the formula

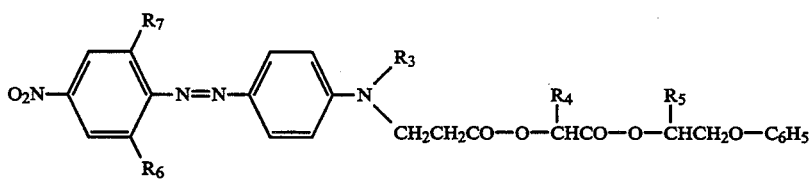

Compounds of the formula

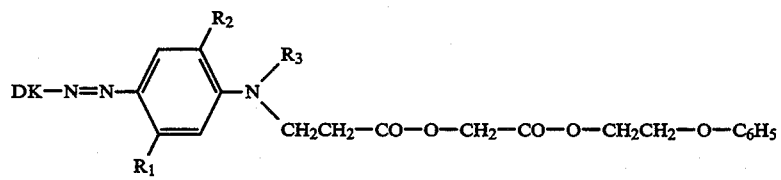

in which the symbols are defined in Table 14 can be prepared from known compounds by an appropriate method of Example 1 to 12.

TABLE 14

| Ex. No. | DK | $R_1$ | $R_2$ | $R_3$ | Nuance on PES |
|---|---|---|---|---|---|
| 332 | 2-(SO$_2$CH$_2$CH$_3$)-4-(O$_2$N)-phenyl | H | H | C$_2$H$_5$ | ruby |
| 333 | 2-CN-4-(O$_2$N)-phenyl | H | H | C$_4$H$_9$ | " |
| 334 | " | H | H | CH$_2$CH$_2$CN | red |
| 335 | 2-COOCH$_3$-4-(O$_2$N)-phenyl | H | H | CH$_3$ | " |
| 336 | 2-Cl-4-(O$_2$N)-phenyl | H | H | C$_2$H$_4$CN | scarlet |
| 337 | 2,5-diCl-4-(O$_2$N)-phenyl | H | H | " | " |
| 338 | 2-Cl-4-(O$_2$N)-phenyl | —NHCOCH$_3$ | H | " | red |
| 339 | " | " | —Cl | H | scarlet |
| 340 | 2-CN-4-(O$_2$N)-phenyl | " | " | H | ruby |
| 341 | 2-(SO$_2$CH$_3$)-4-(O$_2$N)-phenyl | H | H | —CH$_3$ | " |
| 342 | 2,5-diCl-4-(O$_2$N)-phenyl | H | H | —CH$_2$CH=CH$_2$ | yellow brown |

TABLE 14-continued
| Ex. No. | DK | R₁ | R₂ | R₃ | Nuance on PES |
|---|---|---|---|---|---|
| 343 | 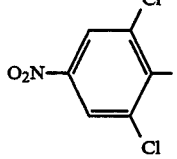 | H | H | —C₄H₉ | " |
| 344 | 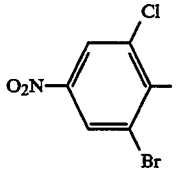 | H | H | —CH₂CH=CH₂ | " |
| 345 | 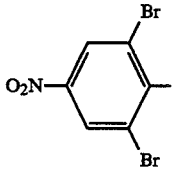 | H | H | " | " |
| 346 | 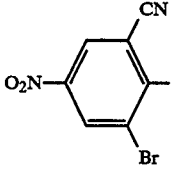 | —NHCOCH₃ | C₂H₅ | | bluish violet |
| 347 | 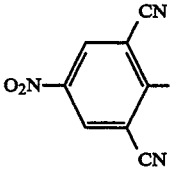 | —CH₃ | H | —C₄H₉ | reddish blue |
| 348 | " | —NHCOCH₃ | H | —C₃H₇ | blue |
| 349 | " | —NHCOC₂H₅ | H | " | " |
| 350 | " | —NHCOCH₃ | H | —C₂H₅/—C₃H₇ (1:1) | " |
| 351 | 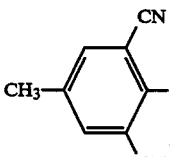 | —CH₃ | H | —C₂H₅ | scarlet |
| 352 | " | —NHCOC₂H₅ | H | C₂H₅ | bluish red |
| 353 | " | —NHSO₂CH₃ | H | C₂H₅/C₃H₇ (1:1) | red |
| 354 | 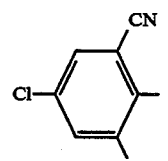 | —NHCOC₂H₅ | H | " | ruby |
| 355 | 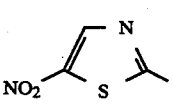 | —CH₃ | H | —C₄H₉ | bluish violet |
| 356 | 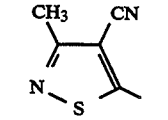 | H | H | —CH₃ | bluish red |

TABLE 14-continued

| Ex. No. | DK | R₁ | R₂ | R₃ | Nuance on PES |
|---|---|---|---|---|---|
| 357 | " | —CH₃ | H | —C₂H₅ | violet |
| 358 | " | —NHCOCH₃ | H | —C₂H₄CN | bluish red |
| 359 | ![pyrazole with CH₃, CN, C₆H₅] | —CH₃ | H | —C₂H₅ | scarlet |
| 360 | " | —NHCOC₂H₅ | H | " | red |
| 361 | ![thiadiazole with C₆H₅] | H | H | —C₂H₅ | scarlet |
| 362 | " | —CH₃ | H | " | red |
| 363 | " | —NHCOCH₃ | H | " | ruby |
| 364 | " | " | H | C₂H₄CN | red |
| 365 | ![imidazole with CN, CN, CH₂CN] | —CH₃ | H | —C₄H₉ | bluish red |
| 366 | ![nitro-benzisothiazole] | " | H | —C₂H₅ | dark blue |
| 367 | " | —NHCOCH₃ | H | —C₂H₅/C₃H₇ (1:1) | greenish blue |
| 368 | ![dinitrothiophene] | H | H | —C₂H₅ | blue |
| 369 | " | —CH₃ | H | " | greenish blue |
| 370 | " | H | H | —C₂H₄OCOCH₃ | reddish blue |
| 371 | " | —NHCOCH₃ | H | —C₂H₅ | bluish green |
| 372 | ![nitrothiophene with COCH₃] | —CH₃ | H | —C₄H₉ | reddish blue |
| 373 | ![nitrothiophene with COOC₂H₅] | " | H | —C₂H₅ | reddish navy |
| 374 | ![thiophene with CN and phenylazo] | H | H | " | dark blue |
| 375 | ![methylthiophene with CN and phenylazo] | H | H | " | " |

TABLE 14-continued

| Ex. No. | DK | R₁ | R₂ | R₃ | Nuance on PES |
|---|---|---|---|---|---|
| 376 | 4-O₂N-C₆H₄-N=N-(thiophene with CN, CH₃) | H | H | —C₂H₅ | greenish blue |
| 377 | 2,4-dinitrophenyl-methyl | —NHCOCH₃ | H | —CH₂C≡CH | red |
| 378 | " | " | H | " | bluish red |
| 379 | thiazole with C₆H₅, CN, CH₃ | H | H | —C₂H₅ | violet |
| 380 | NCS-phenyl-benzothiazoline | H | H | —C₂H₄CN | violet |
| 381 | thiophene with CH₃, CN, CN, CH₃ | —CH₃ | H | —C₂H₅ | " |
| 382 | " | " | H | —CH₃ | " |
| 383 | 4-nitro-benzothiazoline | —CH₃ | H | " | ruby |
| 384 | " | H | H | —C₂H₅ | red |
| 385 | 3,5-dinitro-2-methyl-benzonitrile | —NHCOC₂H₅ | H | " | blue |
| 386 | 3,5-dinitro-2-methyl-benzonitrile | —NHCOCH₃ | H | " | " |
| 387 | " | " | H | —C₂H₅/C₃H₇ (1:1) | " |
| 388 | 2-bromo-4,6-dinitrophenyl | " | H | " | bluish violet |

TABLE 14-continued

| Ex. No. | DK | $R_1$ | $R_2$ | $R_3$ | Nuance on PES |
|---|---|---|---|---|---|
| 389 | 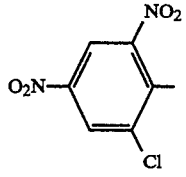 | —NHCOCH$_3$ | H | —C$_2$H$_5$ | " |
| 390 | 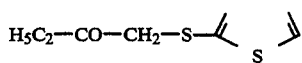 | " | H | " | red |

Compounds of the formula

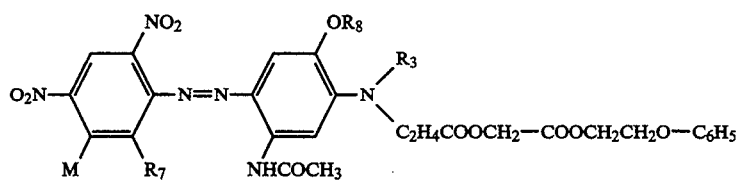

in which the symbols are defined in Table 15 can be prepared from known compounds by an appropriate method of Example 1 to 12.

Compounds of the formula

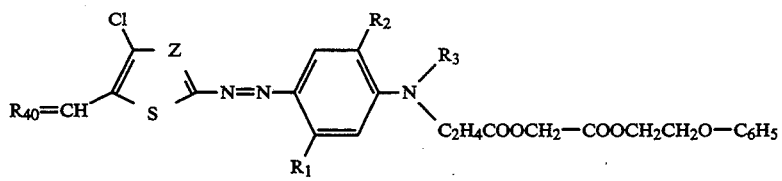

in which the symbols are defined in Table 16 can be prepared from known compounds by an appropriate method of Example 1 to 12.

TABLE 15

| Ex. No. | M | $R_7$ | $R_8$ | $R_3$ | Nuance on PES |
|---|---|---|---|---|---|
| 391 | H | —Br | —CH$_3$ | H | navy blue |
| 392 | H | " | —C$_2$H$_5$ | H | " |
| 393 | H | " | —C$_2$H$_4$OCH$_3$ | H | " |
| 394 | H | Cl | —CH$_3$ | H | " |
| 395 | Cl | " | " | H | " |
| 396 | H | " | —C$_2$H$_4$OCH$_3$ | H | " |
| 397 | H | " | —C$_2$H$_5$ | H | " |
| 398 | H | " | —CH$_3$ | —C$_2$H$_5$ | greenish navy blue |
| 399 | H | " | " | —CH$_2$—CH=CH$_2$ | navy blue |
| 400 | H | Br | " | —CH$_2$—CH=CHCl | reddish navy blue |
| 401 | H | Cl | " | —CH$_2$—CH=CH$_2$ | " |
| 402 | H | " | " | —CH$_2$—C$_6$H$_5$ | navy blue |
| 403 | H | " | —C$_2$H$_5$ | —CH$_2$—CH=CH$_2$ | " |
| 404 | H | " | " | —CH$_2$—CH=CH—Cl | " |
| 405 | H | " | " | —CH$_3$—C≡CH | reddish navy blue |
| 406 | H | Cl | —CH$_3$ | —C$_2$H$_4$—C$_6$H$_5$ | greenish navy blue |
| 407 | H | " | " | —C$_3$H$_6$O—C$_6$H$_5$ | " |
| 408 | H | H | " | —CH—CH=CH—Cl | reddish navy blue |
| 409 | H | —I | " | —CH$_2$CH=CH$_2$ | " |
| 410 | H | —CN | " | " | greenish blue |
| 411 | H | " | " | —C$_2$H$_5$ | bluish green |

TABLE 16

| Ex. No. | $R_{40}$ | Z | $R_1$ | $R_2$ | $R_3$ | Nuance on PES |
|---|---|---|---|---|---|---|
| 412 | =O | =C—CN | —CH$_3$ | H | —C$_2$H$_5$ | blue |
| 413 | =O | " | " | H | —C$_4$H$_9$ | " |
| 414 | 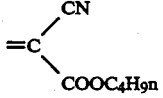 | " | " | H | —C$_2$H$_5$ | greenish-blue |

TABLE 16-continued

| Ex. No. | R40 | Z | R1 | R2 | R3 | Nuance on PES |
|---|---|---|---|---|---|---|
| 415 | =C(CN)(COOC2H5) | " | " | H | " | " |
| 416 | O | " | —NHCOCH3 | H | " | red blue |
| 417 | O | =N— | —CH3 | H | " | violet |
| 418 | O | " | —NHCOCH3 | —OCH3 | H | navy blue |
| 419 | O | " | " | " | —CH2CH=CH2 | " |
| 420 | O | " | " | " | —CH2CH=CH—Cl | " |
| 421 | O | " | " | —OC2H5 | " | " |
| 422 | O | " | " | " | —CH2CH=CH2 | " |
| 423 | O | " | " | —OC2H4COCH3 | " | " |
| 424 | O | " | " | —OC2H5 | " | " |
| 425 | O2N—CH= | " | —CH3 | H | —C2H5 | blue |
| 426 | NC\C(COOC4H9)= | " | " | H | " | " |

Compounds of the formula

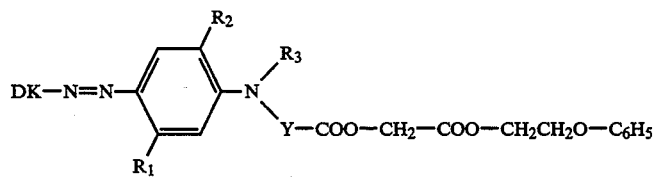

in which the symbols are defined in Table 17 can be prepared from known compounds by an appropriate method of Example 1 to 12.

| Ex. No. | DK | R1 | R2 | Y | R3 | Nuance on PES |
|---|---|---|---|---|---|---|
| 427 | 2-(CN), 4-(O2N)-phenyl | H | H | —CH2CH2CH2— | —CH3 | ruby |
| 428 | " | H | H | —CH2—CH(CH3)— | " | " |
| 429 | 2,4-(O2N)2, 5-Br-phenyl | —NHCOCH3 | —OCH3 | " | H | marine blue |
| 430 | 2,4-(O2N)2, 5-Br-phenyl | " | —OC2H5 | " | H | " |
| 431 | (CH3)2CH—S—C(=N—N=C(CH3)2)—S | —CH3 | H | " | —C2H5 | scarlet red |

EXAMPLE 432–433

The following compounds can be prepared analogously to an appropriate method of Examples 1 to 12.

parts of amidosulphonic acid and 300 parts of ice. To complete the coupling, sodium acetate is added.

The resultant precipitated dyestuff is filtered, washed salt free with water and dried under vacuum at 60° C. The resulting dyestuff is then recrystallised or column

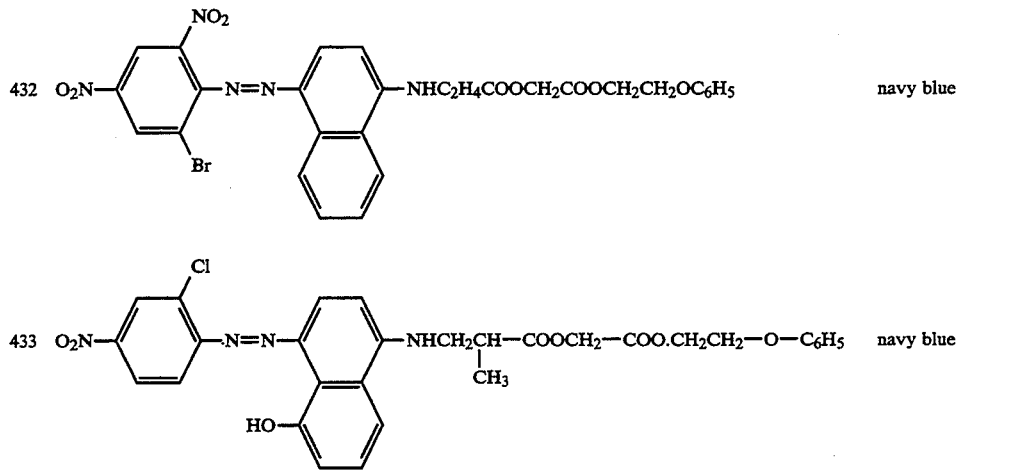

432 navy blue 433 navy blue

EXAMPLE 434

16.3 parts of 2-amino-5-nitrobenzonitrile are stirred into 100 parts of 93% cold sulphuric acid and are then reacted, over 30 minutes with 32 parts of 40% nitrosylsulphuric acid at 0°–5° C.

The resultant diazonium solution is stirred for 3 to 4 hours at 0°–5° C. and is then poured onto a mixture of 26.1 parts of 3-(N-methyl-N-phenylamino)propionic acid-2'-trifluoroethyl ester, 100 parts of glacial acetic acid, 2 parts of amidosulphonic acid, 200 parts of water and 500 parts of ice.

The resultant precipitated dyestuff is filtered, washed salt free with water and dried under vacuum at 60° C. The purification, the dyestuff can be recrystallized or column chromatographed. The resulting dyestuff is of the formula 434a

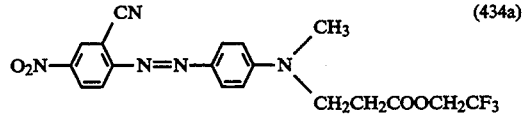

This dyestuff can dye polyester material a ruby red colour and has excellent fastness properties, especially good wet fastness properties after thermofixation at 180° C. This dyestuff is particularly suited for modern Rapid Dyeing processes.

λmax=538 nm (DMF).

EXAMPLE 435

21.8 parts of 2-chloro-4,6-di-nitroaniline are stirred into 150 parts of 93% sulphuric acid at 15°–20° C. and are then reacted, over 30 minutes with 32 parts of 40% nitrosylsulphuric acid.

This is stirred for 2 to 3 hours and the resultant diazonium solution is poured over 15–20 minutes, onto a mixture of 41 parts of 3-(N-3'''-chloroallyl-N-5''-acetylamino-2''-methoxyphenylamino)propionic acid-2'-trifluoroethyl ester, 100 parts of glacial acetic acid, 2 chromatographed to purify the product. The product is a compound of the formula 435a

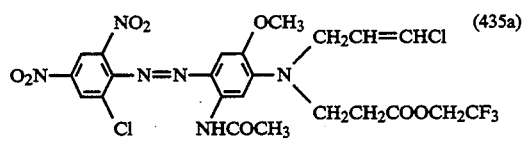

This dyestuff can dye polyester material a navy blue colour and has excellent fastness properties, especially good wet fastness properties. This dyestuff is particularly suited for modern Rapid Dyeing processes. The λmax=595 nm (DMF).

EXAMPLE 436

18.7 parts of 2-amino-4-chloro-3-cyano-5-formyl-thiophene are dissolved in 200 parts of 85% phosphoric acid at −10° to −5° C. Whilst stirring, 33.3 parts of 40% nitrosyl sulphuric acid are added and the mixture stirred for about 3–4 hours at about 0° C. The resulting solution is added whilst stirring well, to a solution of 27.5 parts of 3-(N-ethyl-N-3''-methylphenylamino)-propionic acid-2'-trifluoroethyl ester, 250 parts of glacial acetic acid, 80 parts water and 1000 parts of ice. The mixture is stirred for 30 minutes and then diluted slowly with 2000 parts of icewater. The dyestuff suspension is filtered and washed acid free with water. The product is dried under vacuum at 50° C.

The resulting dyestuff is then recrystallised or column chromatographed to purify the product. A dyestuff of the formula 436a

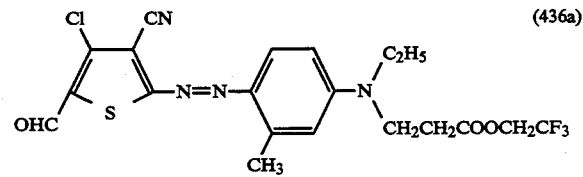

results.

This dyestuff dyes polyester fibres a clear reddish blue tone with good fastness properties, especially good wet fastness properties (ie in the C4A wash test from M&S) after thermofixing at 180° C. The product is particularly suitable for Rapid Dyeing processes.

EXAMPLES 437–503

In Table 18, compounds of the formula

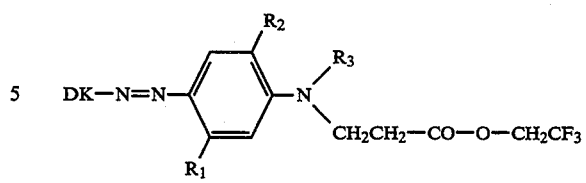

where the symbols are as defined in Table 18 as well as the dyes of Tables 19–21 can be made analogously to Examples 434–436 from appropriate reactants.

TABLE 18

| Ex. No. | DK | $R_1$ | $R_2$ | $R_3$ | Nuance on PES |
|---|---|---|---|---|---|
| 437 | 2-CN, 4-O$_2$N-phenyl | H | H | —CH$_2$C$_6$H$_5$ | ruby red |
| 438 | " | H | H | —C$_2$H$_5$ | " |
| 439 | " | H | H | C$_2$H$_4$CN | " |
| 440 | " | H | H | —C$_2$H$_4$O—COCH$_3$ | " |
| 441 | 2-COOCH$_3$, 4-O$_2$N-phenyl | H | H | —CH$_3$ | " |
| 442 | 2-Cl, 4-O$_2$N-phenyl | —NHCOCH$_3$ | H | C$_2$H$_2$CN | red |
| 443 | " | " | —Cl | H | scarlet |
| 444 | 2-CN, 4-O$_2$N-phenyl | " | " | H | ruby red |
| 445 | 2,4-Cl$_2$, 5-O$_2$N-phenyl | H | H | —C$_2$H$_5$ | yellow brown |
| 446 | 2,4-Cl$_2$, 5-O$_2$N-phenyl | H | H | —CH$_2$C$_6$H$_5$ | " |
| 447 | 2-Cl, 4-Br, 5-O$_2$N-phenyl | H | H | —CH$_2$CH$_2$CN | yellow brown |

TABLE 18-continued

| Ex. No. | DK | R₁ | R₂ | R₃ | Nuance on PES |
|---|---|---|---|---|---|
| 448 | 2-methyl-4-nitro-1,3-dicyanobenzene (O₂N, CN, CN, CH₃ substituted benzene) | —CH₃ | H | —C₄H₉-n | reddish blue |
| 449 | " | —NHCOCH₃ | H | —C₃H₇-n | blue |
| 450 | " | —NHCOC₂H₅ | H | —C₃H₇-n | " |
| 451 | 2,5-dimethyl-1,3-dicyanobenzene (CH₃, CN, CN, CH₃ substituted benzene) | —CH₃ | H | —C₂H₅ | scarlet |
| 452 | " | —NHCO₂C₂H₅ | H | " | blue red |
| 453 | 3-methyl-5-nitroisothiazole (O₂N, N, S ring with CH₃) | —CH₃ | H | —C₄H₉n | bluish violet |
| 454 | 4-cyano-3,5-dimethylisothiazole (H₃C, CN, N, S with CH₃) | H | H | —CH₃ | bluish red |
| 455 | " | —CH₃ | H | —C₂H₅ | Violet |
| 456 | " | —NHCOCH₃ | H | —C₂H₄CN | bluish red |
| 457 | 3-methyl-4-phenyl-1,2,5-thiadiazole (C₆H₅, N, N, S ring with CH₃) | H | H | —C₂H₅ | scarlet |
| 458 | " | —CH₃ | H | " | red |
| 459 | 3-methyl-4-phenyl-1,2,5-thiadiazole (C₆H₅, N, N, S ring with CH₃) | " | H | —C₂H₄CN | red |
| 460 | 4,5-dicyano-2-methyl-1-(cyanomethyl)imidazole (CN, CN, N, N, CH₃, CH₂CN) | —CH₃ | H | —C₄H₉n | bluish red |
| 461 | 3-methyl-5-nitro-2,1-benzisothiazole (O₂N benzisothiazole with CH₃) | " | H | —C₂H₅ | dark blue |
| 462 | " | —NHCOCH₃ | H | —C₂H₅/C₃H₇ (1:1) | greenish blue |
| 463 | 2-methyl-3,5-dinitrothiophene (NO₂, O₂N, S with CH₃) | H | H | —C₂H₅ | blue |
| 464 | " | —CH₃ | H | " | greenish blue |
| 465 | " | —NHCOCH₃ | H | —C₂H₅ | green |

TABLE 18-continued

| Ex. No. | DK | $R_1$ | $R_2$ | $R_3$ | Nuance on PES |
|---|---|---|---|---|---|
| 466 | ![structure: thiophene with COCH3, CH3, O2N-S] | —CH$_3$ | H | —C$_4$H$_9$n | reddish blue |
| 467 | ![structure: thiophene with CN, H5C6—N=N—, CH3] | H | H | " | dark blue |
| 468 | ![structure: O2N-phenyl-N=N-thiophene with CN, CH3] | H | H | —C$_2$H$_5$ | greenish navy |
| 469 | ![structure: benzene with NO2, O2N, CN] | —NHCOC$_2$H$_5$ | H | " | blue |
| 470 | " | —NHCOCH$_3$ | H | " | blue |
| 471 | " | " | H | —C$_2$H$_5$/—C$_3$H$_7$-n (1:1) | " |
| 472 | ![structure: benzene with NO2, O2N, Br] | " | H | " | bluish violet |
| 473 | " | —NHCOC$_2$H$_5$ | H | " | " |
| 474 | ![structure: thiadiazole with CO-CH2-S, OC2H5] | " | H | " | red |

TABLE 19

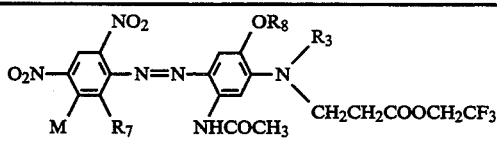

| Ex. No. | M | $R_7$ | $R_8$ | $R_3$ | Nuance on PES |
|---|---|---|---|---|---|
| 475 | H | —Br | —CH$_3$ | H | navy blue |
| 476 | H | " | —C$_2$H$_5$ | H | " |
| 477 | H | —Cl | —CH$_3$ | H | " |
| 478 | —Cl | —Cl | —CH$_3$ | H | " |
| 479 | H | " | —C$_2$H$_4$OCH$_3$ | H | " |
| 480 | H | " | " | —CH$_2$—CH=CH$_2$ | greenish navy |
| 481 | H | Br | " | —CH$_2$—CH=CHCl | reddish navy |
| 482 | H | " | " | —CH$_2$—C≡CH | " |
| 483 | H | " | —C$_2$H$_5$ | H | navy blue |
| 484 | H | " | " | —CH$_2$—CH=CH$_2$ | greenish navy |
| 485 | H | " | —CH$_3$ | —CH$_2$—CH=CH—Cl | reddish navy |
| 486 | H | —CN | " | " | greenish blue |
| 487 | H | Cl | " | —CH$_2$COOCH$_2$—C≡CH | reddish navy blue |
| 488 | H | " | " | —CH$_2$COOCH$_2$—CH=CH$_2$ | " |
| 489 | H | " | " | —CH$_2$COOC$_2$H$_5$ | " |

TABLE 20
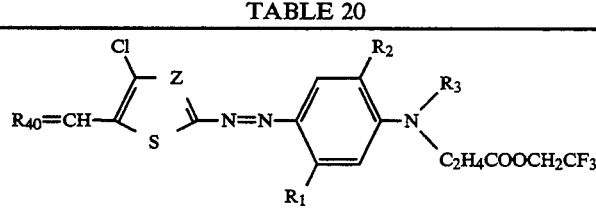
| Ex. No. | R₄₀ | Z | R₁ | R₂ | R₃ | Nuance on PES |
|---|---|---|---|---|---|---|
| 490 | $=O$ | $-C-CN$ | $-CH_3$ | H | $-C_2H_5$ | bluish violet |
| 491 | $=O$ | " | " | H | $-C_4H_9-n$ | " |
| 492 | $=CH-NO_2$ | " | " | H | $-C_2H_5$ | blue |
| 493 | $=C(CN)-COOC_2H_5$ $=C(CN)-COOC_4H_9n$ (1:1 ratio) | " | " | H | " | " |
| 494 | $=O$ | $=N-$ | $-NHCOCH_3$ | $-OCH_3$ | H | navy blue |
| 495 | $=O$ | $=N-$ | " | " | $-CH_2CH=CH_2$ | reddish navy |
| 496 | $=O$ | " | " | $-OCH_3$ | $-CH_2-CH-CH-Cl$ | " |
| 497 | $=O$ | " | " | $-OC_2H_5$ | " | " |
| 498 | $=O$ | " | " | " | $-CH_2-CH=CH_2$ | " |
| 499 | $=O$ | " | " | $-OC_2H_5$ | " | " |
TABLE 20
| Ex. No. | Nuance on PES |
|---|---|
| 500 | blue |
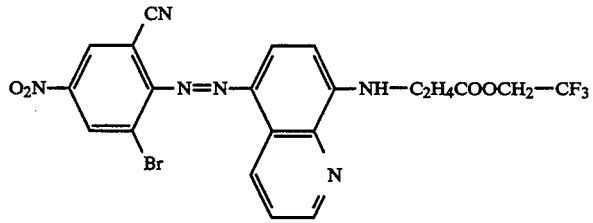
| 501 | navy blue |
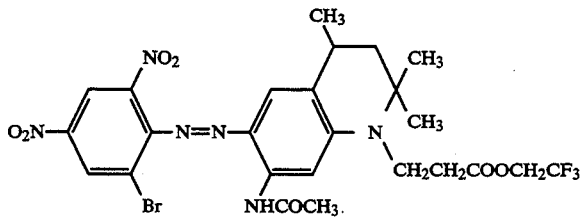
| 502 | blue |
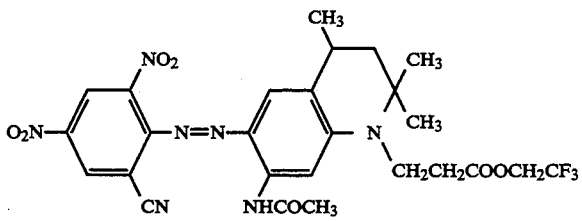
| 503 | ruby red |
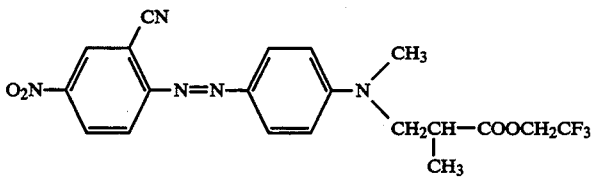

EXAMPLE 504

17.4 parts of 1-amino-2,4-dinitro-6-chlorobenzene are dissolved in 137 parts of 93% sulphuric acid. The mixture is cooled to 10° to 15° C. Whilst stirring well, 33.3 parts of 40% nitrosyl sulphuric acid are added and the mixture stirred for about 1 hour at about 0° C. The resulting solution is added over 15 minutes to a solution of 40 parts of 3-(N-allyl-N-2″-methoxy-5″-acetylamino-phenylamino)propionic acid-2′-tetrafluoropropyl ester, 500 parts of water and 800 parts of icewater. To complete the reaction sodium acetate is added. The dyestuff suspension is filtered and washed acid free with water. The product is dried under vacuum at 50° C. The resulting dyestuff is then recrystallised or column chromatographed to purify the product. A dyestuff of the formula 504a

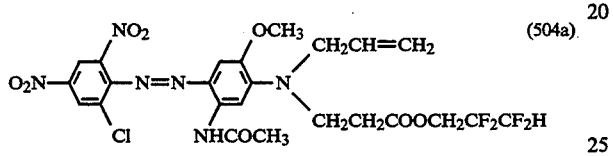

results.

This dyestuff dyes polyester fibres a navy blue tone with good fastness properties.

In the Examples where column chromatography is performed the eluent is ethylmethylketone/toluene.

Application Example

The dyestuff of Example 1 (of formula 1a) is sand-milled with a commercially available dispersing agent, for example a commercially available lignin sulphonate and then the mixture is sprayed dry to an ultrafine powder having an average particle size of 1μ and a coupage ratio of 3.5:10.

12 parts of this ultra fine powder are dispersed in 100 parts of water and this is added at 60° C. to 13,000 parts of a circulating liquor (containing 30 parts of ammonium sulphate and 0.3 parts of formic acid as a buffer and optionally a carrier-/levelling agent combination).

In a dyeing autoclave with a precleaned pressed cross spool of 1000 parts of polyester yarn on a plastic holder the circulating liquor is then heated to 130° C. over 35 minutes. After 90 minutes at 130° C., the autoclave is cooled to 80° C. and the exhausted liquor is drained off. The resulting dyed substrate is washed thoroughly with cold water and then reductively cleared according to known art standard methods and finally dried. A level, deep ruby red colour results.

The Application Example can be repeated using, instead of the dyestuff of Example 1, an appropriate amount of any one of Examples 2 to 504.

What is claimed is:

1. A compound of the formula I

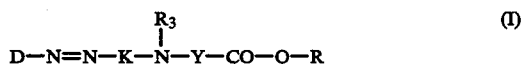

in which

D is a diazo component;

K is an aromatic group of the formula a, b or c

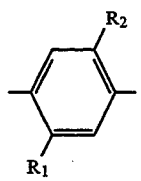

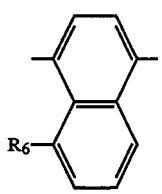

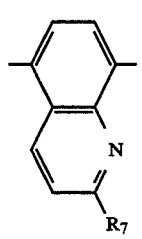

where

R is a group of the formula —CH(R$_4$)—CO—O—R$_5$, —CH$_2$CF$_3$ or —CH$_2$CF$_2$CF$_2$H;

R$_6$ is hydrogen or hydroxy,

R$_1$ is hydrogen, chloro, C$_{1-4}$alkyl, C$_{1-4}$alkoxy or acylamino,

R$_2$ is hydrogen, C$_{1-4}$alkoxy, C$_{1-4}$alkoxyethoxy, chloro, bromo and

R$_3$ is selected from hydrogen, C$_{1-6}$alkyl, C$_{3-4}$alkenyl, chloroC$_{3-4}$alkenyl, bromoC$_{3-4}$alkenyl, C$_{3-4}$ alkynyl, phenyl-C$_{1-4}$alkyl, C$_{1-4}$alkoxycarbonyl-C$_{1-4}$alkyl, C$_{3-4}$alkenyloxycarbonyl-C$_{1-4}$ alkyl, C$_{3-4}$ alkynyloxycarbonyl-C$_{1-4}$alkyl, phenoxy-C$_{2-4}$alkyl, —CH$_2$—CH(R$_8$)CH$_2$—R$_9$ and C$_{2-4}$ alkyl substituted by 1 to 3 groups selected from halogen, cyano, C$_{1-4}$alkoxy, C$_{1-4}$alkylcarbonyloxy and C$_{1-4}$ alkoxycarbonyloxy;

or R$_2$ together with R$_3$ in the group a) form a group of the formula-*CH(CH$_3$)CH$_2$C(CH$_3$)$_2$ where the * carbon atom is attached to the group a);

R$_4$ is hydrogen, phenyl or C$_{1-4}$ alkyl,

R$_5$ is phenyl, unsubstituted or substituted by one to three groups selected from halogen, C$_{1-4}$ alkyl, C$_{1-4}$ alkoxycarbonyl and C$_{1-4}$ alkoxy or phenyl substituted by one group selected from formyl, cyan, rhodan, phenyl, benzyloxy, C$_{1-4}$alkoxycarbonyl-C$_{1-2}$alkoxy, C$_{1-4}$ alkylcarbonylamino, C$_{1-4}$ alkylcarbonyloxy and nitro; alpha or beta naphthyl, phenyl-C$_{1-4}$ alkyl or 1-phenyl-propenyl-3, in which the phenyl group (in phenyl C$_{1-4}$alkyl and 1-phenyl propenyl-3) is unsubstituted or substituted by one or two substituents selected from halogen, C$_{1-4}$alkyl and C$_{1-4}$ alkoxy or by one nitro or C$_{1-4}$ alkoxycarbonyl group; or R$_5$ is allyl, haloallyl, methallyl, propargyl, tetrahydrofuryl-2-methyl, tetrahydropyranyl-2-methyl, chlor-C$_{2-4}$ alkyl, bromoC$_{2-4}$ alkyl or a group of the formula

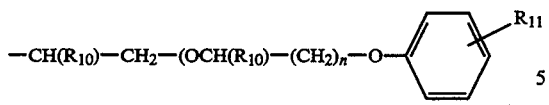

R₇ is hydrogen or C₁₋₄ alkyl;

R₈ is hydroxy, C₁₋₄ alkylcarbonyloxy or C₁₋₄ alkoxycarbonyloxy;

R₉ is chloro, C₁₋₄ alkoxy, phenoxy, allyloxy or C₁₋₄ alkylcarbonyloxy;

R₁₀ is hydrogen or C₁₋₄ alkyl;

R₁₁ is hydrogen, halogen, C₁₋₄ alkyl, C₁₋₄ alkoxy or nitro

Y is C₂₋₃ alkylene and n is 0 or 1;

with the proviso that when K is a group of formula b) or c), then R₃ is hydrogen (and mixtures containing compounds of formula I).

2. A compound according to claim 1 in which D is a diazo component of the phenyl, thienyl, thiazolyl, isothiazolyl, thiadiazolyl, pyrazolyl, imidazolyl, triazolyl, benzthiazolyl, or benzisothiazolyl series.

3. A compound according to claim 1 in which D is D₁ where D₁ is a compound of formula 1 to 11 below

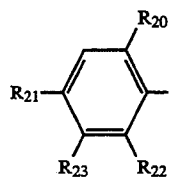 (1)

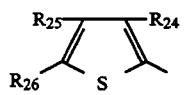 (2)

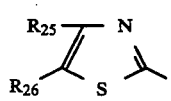 (3)

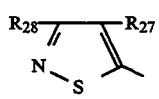 (4)

(5)

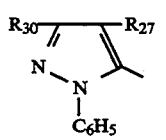 (6)

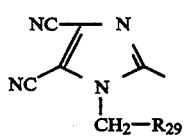 (7)

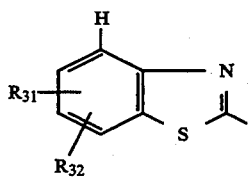 (8)

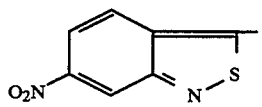 (9)

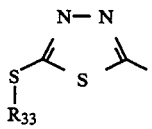 (10)

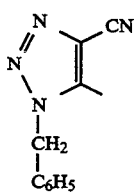 (11)

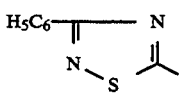

in which

R₂₀ is hydrogen, chloro, bromo, cyano, nitro-, C₁₋₄alkoxy carbonyl, C₁₋₄alkylsulphonyl;

R₂₁ is chloro, bromo, nitro, C₁₋₄alkyl, C₁₋₄alkylsulfonyl, C₁₋₄alkylcarbonyl, aminosulfonyl, mono- or di-C₁₋₄alkylaminosulfonyl, phenylaminosulfonyl, C₁₋₄alkoxycarbonyl, aminocarbonyl, mono- or di-C₁₋₄-alkylaminocarbonyl, phenylaminocarbonyl, phenylazo, benzyloxycarbonyl, tetrahydro-furfuryl-2-oxycarbonyl, C₃₋₄alkenyloxycarbonyl or C₃₋₄alkinyloxycarbonyl;

R₂₂ is hydrogen, chloro, bromo or cyano;

R₂₃ is hydrogen or chloro, or when R₂₂ is hydrogen, R₂₃ is additionally rhodan;

R₂₄ is nitro, C₁₋₄alkylcarbonyl, C₁₋₄alkoxycarbonyl, cyano, aminocarbonyl, mono- or di-C₁₋₂alkylaminocarbonyl;

R₂₅ is hydrogen chloro, bromo, C₁₋₄alkyl or phenyl;

R₂₆ is nitro, cyano, formyl, dicyanovinyl or a group of the formula —CH=CH—NO₂, —CH=C(CN)CO—OC₁₋₄-alkyl, H₅C₆—N=N— or 3- or 4—NO₂—C₆H₄—N=N—;

R₂₇ is cyano or C₁₋₄alkoxycarbonyl;

R₂₈ is C₁₋₄alkyl or phenyl;

R₂₉ is —CN, —CH=CH₂ or phenyl;

R₃₀ is C₁₋₄alkyl;

R₃₁ is hydrogen, chloro, bromo, cyano, rhodan, nitro, C₁₋₄alkoxycarbonyl or di-C₁₋₄alkylaminosulfonyl;

R₃₂ is hydrogen chloro or bromo; and

R₃₃ is C₁₋₄alkyl, C₁₋₄alkoxycarbonyl-C₁₋₄alkylene or —C₁₋₄alkylene-COOCH₂CF₃ in which any phenyl group present in R₂₀ to R₃₀ is unsubstituted or substituted by one or two groups selected from chloro, bromo, methyl, ethyl, methoxy and ethoxy.

4. A compound according to claim 1 in which K is K₁ where K₁ is a group of formula a) defined above.

5. A compound according to claim 1 in which R is R' where R' is —CH(R₄')—CO—O—R₅' or —CH₂CF₃ where R₄' is selected from hydrogen and C₁₋₂ alkyl and R₅' is phenyl, unsubstituted or substituted by one or two substituents selected from chloro, C₁₋₂ alkyl, C₁₋₂ alkoxy and one phenyl; phenyl C₁₋₂ alkyl, phenoxy ethyl or 1-phenylpropenyl-3, the phenyl group of each of the last three substituents (phenyl $C_{1-2}$ alkyl, phenoxy ethyl or 1-phenylpropenyl-3) being unsubstituted or substituted by one or two groups selected from chloro, methyl and $C_{1-2}$ alkoxy or one group nitro) or $R_5'$ is alpha and beta naphthyl.

6. A compound according to claim 1 in which $R_1$ is $R_1'$ where $R_1'$ is selected from hydrogen, $C_{1-2}$ alkyl, chloro and acylamino.

7. A compound according to claim 1 in which $R_2$ is $R_2'$ where $R_2'$ is selected from hydrogen, chloro, $C_{1-2}$ alkoxy, $C_{1-2}$ alkoxyethoxy or $R_2'$ (when in formula a) together with $R_3$ forms the group —CH(CH$_3$)CH$_2$C(CH$_3$)$_2$.

8. A compound according to claim 1 in which $R_3$ is $R_3'$ where $R_3'$ is selected from hydrogen, $C_{1-4}$ alkyl, cyanoethyl, $C_{1-2}$ alkoxyethyl, $C_{3-4}$ alkenyl, chloroallyl, $C_{3-4}$ alkynyl, $C_{1-2}$ alkoxycarbonylmethyl, allyloxycarbonylmethyl or propargyloxycarbonylmethyl.

9. A compound according to claim 1 in which $R_4$ is $R_4'$ where $R_4'$ is selected from hydrogen and $C_{1-2}$ alkyl.

10. A compound according to claim 1 in which $R_5$ is $R_5'$ where $R_5'$ is phenyl, unsubstituted or substituted by one or two substituents selected from chloro, $C_{1-2}$ alkyl, $C_{1-2}$ alkoxy and one phenyl; phenyl $C_{1-2}$ alkyl, phenoxy ethyl or 1-phenylpropenyl-3, the phenyl group of each of the last three substituents (phenyl $C_{1-2}$ alkyl, phenoxy ethyl or 1-phenylpropenyl-3) being unsubstituted or substituted by one or two groups selected from chloro, methyl and $C_{1-2}$ alkoxy or one group nitro) or $R_5'$ is alpha and beta naphthyl.

11. A compound according to claim 1 in which Y is Y' where Y' is a group of the formula —CH$_2$CH$_2$— or —CH$_2$CH(CH$_3$)—.

12. A compound according to claim 1 in which D is D$_2$ where D$_2$ is a diazo component of the 2,6-dicyano-4-chlorophenyl,2,6-dicyano-4-bromo-phenyl,2,6-dicyano-4-methylphenyl, 2,6-dicyano-4-nitrophenyl 2,4-dinitro-6-chlorophenyl, 2,4-dinitro-6-bromophenyl, 2,4-dinitro-6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro- or 2-cyano-4-nitro-phenyl, 2,4-dinitro-5-chlorophenyl, 2,4-dinitro-5,6-dichlorophenyl, 2,5-dichloro-4-nitro-phenyl, 4-nitrophenyl, 4-phenylazophenyl, 4-$C_{1-4}$alkoxy-carbonylphenyl, 2-$C_{1-4}$alkoxycarbonyl-4-nitrophenyl, 4-benzyloxycarbonylphenyl, 4-(tetrahydro-furfuryl-2'-oxycarbonyl)-phenyl, 3,5-dicyano-4-chlorothienyl-2,3,5-dicyanothienyl-2,3-cyano-5-nitro-thienyl-2,3-acetyl-5-nitro-thienyl-2,3,5-dinitrothienyl-2,3-($C_{1-4}$alkoxycarbonyl)-5-nitro-thienyl-2,5-phenylazo-3-cyano-thienyl-2,5-phenylazo-3-cyano-4-methyl-thienyl-2,5-nitro-thiazolyl-2,5-nitrobenzisothiazolyl-3,3-methyl-4-cyano-isothiazolyl-5,3-Phenyl-1,2,4-thiadiazolyl-2,5-($C_{1-2}$alkylmercapto)-1,3,4-thiadiazolyl-2,3-$C_{1-4}$alkoxycarbonylethylmercapto-1,2,4-thiadiazolyl-5,1-cyano-methyl-4,5-dicyano-imidazolyl-2,6-nitrobenzthiazolyl-2,5-nitrobenzthiazolyl-2,6-rhodanbenzthiazolyl-2,6-chlorobenzthiazolyl-2,(5),6,(7)-dichlorobenzthiazolyl-2, or a group of the formula

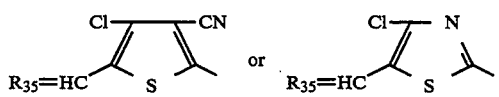

or

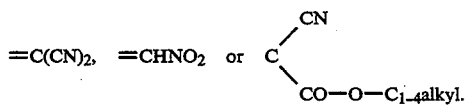

where $R_{35}$ is oxygen or a group of the formula

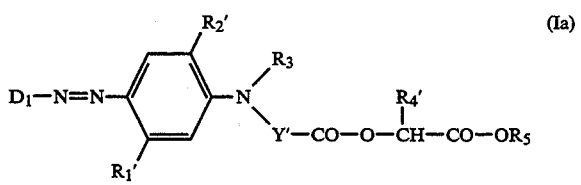

=C(CN)$_2$, =CHNO$_2$ or

13. A compound according to claim 1 in which the compounds of formula I are of formula Ia

(Ia)

in which

D$_1$ is a compound of formula 1 to 11 below

(1)

(2)

(3)

(4)

(5)

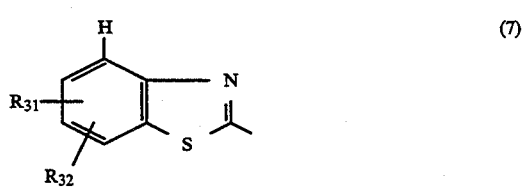

(6)

(7)

-continued (8)

(9)

(10)

(11)

in which
R$_{20}$ is hydrogen, chloro, bromo, cyano, nitro-, C$_{1-4}$ alkoxy carbonyl, C$_{1-4}$alkylsulphonyl;

R$_{21}$ is chloro, bromo, nitro, C$_{1-4}$alkyl, C$_{1-4}$alkylsulfonyl, C$_{1-4}$alkylcarbonyl, aminosulfonyl, mono- or di-C$_{1-4}$alkylaminosulfonyl, phenylaminosulfonyl, C$_{1-4}$alkoxycarbonyl, aminocarbonyl, mono- or di-C$_{1-4}$-alkylaminocarbonyl, phenylaminocarbonyl, phenylazo, benzyloxycarbonyl, tetrahydro-furfuryl-2-oxycarbonyl, C$_{3-4}$alkenyloxycarbonyl or C$_{3-4}$alkinyloxycarbonyl;

R$_{22}$ is hydrogen, chloro, bromo or cyano;

R$_{23}$ is hydrogen or chloro, or when R$_{22}$ is hydrogen, R$_{23}$ is additionally rhodan;

R$_{24}$ is nitro, C$_{1-4}$alkylcarbonyl, C$_{1-4}$alkoxycarbonyl, cyano, aminocarbonyl, mono- or di-C$_{1-2}$alkylaminocarbonyl;

R$_{25}$ is hydrogen, chloro, bromo, C$_{1-4}$alkyl or phenyl;

R$_{26}$ is nitro, cyano, formyl, dicyanovinyl or a group of the formula —CH=CH—NO$_2$, —CH=C(CN)CO—OC$_{1-4}$-alkyl, H$_5$C$_6$—N=N— or 3- or 4-NO$_2$—C$_6$H$_4$—N=N—;

R$_{27}$ is cyano or C$_{1-4}$alkoxycarbonyl;

R$_{28}$ is C$_{1-4}$alkyl or phenyl;

R$_{29}$ is —CN, —CH=CH$_2$ or phenyl;

R$_{30}$ is C$_{1-4}$alkyl;

R$_{31}$ is hydrogen, chloro, bromo, cyano, rhodan, nitro, C$_{1-4}$alkoxycarbonyl or di-C$_{1-4}$alkylaminosulfonyl;

R$_{32}$ is hydrogen chloro or bromo; and

R$_{33}$ is C$_{1-4}$alkyl, C$_{1-4}$alkoxycarbonyl-C$_{1-4}$alkylene or —C$_{1-4}$alkylene-COOCH$_2$CF$_3$ in which any phenyl group present in R$_{20}$ to R$_{30}$ is unsubstituted or substituted by one or two groups selected from chloro, bromo, methyl, ethyl, methoxy and ethoxy;

R$_1'$ where R$_1'$ is selected from hydrogen, C$_{1-2}$ alkyl, chloro and acylamino;

R$_2'$ where R$_2'$ is selected from hydrogen, chloro, C$_{1-2}$ alkoxy, C$_{1-2}$ alkoxyethoxy or R$_2'$ (when in formula a) together with R$_3$ forms the group —CH(CH$_3$)CH$_2$C(CH$_3$)$_2$;

Y' where Y' is a group of the formula —CH$_2$CH$_2$— or —CH$_2$CH(CH$_3$)—;

R$_4'$ where R$_4'$ is selected from hydrogen and C$_{1-2}$ alkyl; and

R$_3$ and R$_5$ are as defined in claim 1.

14. A compound according to claim 1 in which the compounds of formula I are of formula Ib (Ib)

in which

D$_2$ is is a diazo component of the 2,6-dicyano-4-chlorophenyl, 2,6-dicyano-4-bromophenyl, 2,6-dicyano-4-methylphenyl, 2,6-dicyano-4-nitrophenyl,2,4-dinitro-6-chlorophenyl, 2,4-dinitro-6-bromophenyl, 2,4-dinitro-6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro- or 2-cyano-4-nitrophenyl, 2,4-dinitro-5-chlorophenyl,2,4-dinitro-5,6-dichlorophenyl,2,5-dichloro-4-nitro-phenyl,4-nitrophenyl, 4-phenylazophenyl, 4-C$_{1-4}$alkoxy-carbonyl-phenyl, 2-C$_{1-4}$alkoxycarbonyl-4-nitrophenyl, 4-benzyloxycarbonylphenyl, 4-(tetrahydro-furfuryl-2'-oxycarbonyl)-phenyl, 3,5-dicyano-4-chlorothienyl-2, 3,5-dicyanothienyl-2,3-cyano-5-nitro-thienyl-2,3-acetyl-5-nitrothienyl-2,3,5-dinitrothienyl-2,3-(C$_{1-4}$alkoxycarbonyl)-5-nitro-thienyl-2,5-phenylazo-3-cyanothienyl-2,5-phenylazo-3-cyano-4-methyl-thienyl-2,5-nitro-thiazolyl-2,5-nitro-benzisothiazolyl-3,3-methyl-4-cyano-isothiazolyl-5,3-Phenyl-1,2,4-thiadiazolyl-2,5-(C$_{1-2}$alkylmercapto)-1,3,4-thiadiazolyl-2,3-C$_{1-4}$alkoxycarbonylethylmercapto-1,2,4-thiadiazolyl-5,1-cyanomethyl-4,5-dicyano-imidazolyl-2,6-nitrobenzthiazolyl-2,5-nitrobenzthiazolyl-2,6-rhodan-benzthiazolyl-2,6-chlorobenzthiazolyl-2, ( 5),6,(7)-dichloro-benz-thiazolyl-2, or a group of the formula where R$_{35}$ is oxygen or a group of the formula =C(CN)$_2$, =CHNO$_2$ or =C(CN)(CO—O—C$_{1-4}$alkyl)

R$_1'$ where R$_1'$ is selected from hydrogen, C$_{1-2}$ alkyl, chloro and acylamino;

R$_2'$ where R$_2'$ is selected from hydrogen, chloro, C$_{1-2}$ alkoxy, C$_{1-2}$ alkoxyethoxy or R$_2'$ (when in formula a) together with R$_3$ forms the group —CH(CH$_3$)CH$_2$C(CH$_3$)$_2$;

Y' where Y' is a group of the formula —CH$_2$CH$_2$— or —CH$_2$CH(CH$_3$)—;

R$_4'$ where R$_4'$ is selected from hydrogen and C$_{1-2}$ alkyl;

and $R_3$ and $R_5$ are as defined in claim 1.

15. A compound according to claim 1 in which the compounds of formula I are those of formula Ic

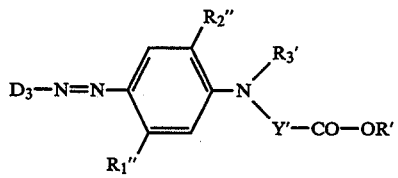

(Ic)

in which $D_3$ is a diazo component of the 2,4-dinitro-6-chlorophenyl, 2,4-dinitro-6-bromophenyl, 2,4-dinitro-6-cyanophenyl, 2,4-dinitro-5-chlorophenyl or 2,4-dinitro-5-rhodanphenyl, 2,4-dinitro-5,6-dichlorophenyl series;

$R'$ is $-CH(R_4')-CO-O-R_5'$ or $CH_2CF_3$ where $R_4'$ and $R_5'$ are defined below;

$R_1''$ is acylamino;

$R_2''$ is $C_{1-2}$ alkoxy or $C_{1-2}$ alkoxyethoxy, $R_3'$ is selected from hydrogen, $C_{1-4}$alkyl, cyanoethyl, $C_{1-2}$alkoxyethyl, $C_{3-4}$alkenyl, chloro$C_{3-4}$alkenyl, $C_{3-4}$alkynyl, $C_{1-2}$alkoxycarbonylmethyl, allyloxycarbonylmethyl, or propargyl-oxycarbonylmethyl;

$R_4'$ is selected from hydrogen and $C_{1-2}$ alkyl;

$R_5'$ is phenyl, unsubstituted or substituted by one or two substituents selected from chloro, $C_{1-2}$ alkyl, $C_{1-2}$ alkoxy and phenyl; phenyl $C_{1-2}$ alkyl, phenoxy ethyl or 1-phenylpropenyl-3, (the phenyl group of each of the last three substituents (phenyl $C_{1-2}$ alkyl, phenoxy ethyl or 1-phenylpropenyl-3) being unsubstituted or substituted by one or two groups selected from chloro, methyl and $C_{1-2}$ alkoxy or one group nitro) or $R_5'$ is alpha and beta naphthyl; and Y is Y' where Y' is a group of the formula $-CH_2CH_2-$ or $-CH_2CH(CH_3)-$.

16. A compound according to claim 15 in which the compounds of formula Ic are those in which $D_3$ is $D_3'$ where $D_3'$ is a diazo component of the 2,4-dinitro-6-chlorophenyl or 2,4-dinitro-6-bromophenyl series;

$R_1''$ is $-NH-COC_{1-2}$alkyl;

$R_2''$ is $R_2'''$ where $R_2'''$ is $C_{1-2}$ alkoxy;

$R_3'$ is $R_{3a}$ where $R_{3a}$ is hydrogen, allyl, chloroallyl or propargyl;

$R_5'$ is $R_5''$ where $R_5''$ is phenyl, phenoxyethyl or benzyl, in which the phenyl group of each substituent is unsubstituted or substituted by one or two groups selected from chloro, methyl and $C_{1-2}$ alkoxy or one group nitro;

$R'$ is $R'''$ where $R'''$ is a group of the formula $-CH_2CO-O-R_5''$, where $R_5''$ is defined above; and Y is Y'' where Y'' is 1,2 ethylene.

17. A compound according to claim 1 in which the compounds of formula I are those of formula Id

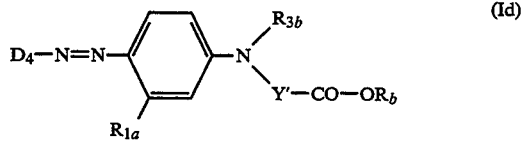

(Id)

in which $D_4$ is a diazo component of the 4-nitrophenyl, 2-chloro-4-nitrophenyl, 2,6-dichloro-4-nitrophenyl, 2-chloro-4-nitro-6-bromophenyl or 2-cyano-4-nitrophenyl series; $R_{1a}$ is hydrogen, methyl, acylamino or chloro;

$R_b$ is a group of the formula $-CH(R_4')-CO-O-R_5'$, where $R_4'$ is selected from hydrogen and $C_{1-2}$ alkyl and $R_5'$ is phenyl, unsubstituted or substituted by one or two substituents selected from chloro, $C_{1-2}$alkyl, $C_{1-2}$alkoxy and phenyl; phenyl $C_{1-2}$alkyl or 1-phenylpropenyl-3 (the phenyl group of each of the last two substituents (phenyl $C_{1-2}$alkyl or 1-phenylpropenyl-3) being unsubstituted or substituted by one or two groups selected from chloro, methyl and $C_{1-2}$alkoxy or one group nitro or $R_5'$ is alpha and beta naphthyl;

$R_{3b}$ is $C_{1-4}$alkyl, cyano-$C_{1-4}$alkyl, $C_{1-4}$alkoxyethyl, $-C_2H_4-O-CO-C_{1-4}$alkyl, $-C_2H_4-O-CO-OC_{1-4}$ alkyl or benzyl;

$R_4'$ is selected from hydrogen and $C_{1-2}$ alkyl;

$R_5'$ is phenyl, unsubstituted or substituted by one or two substituents selected from chloro, $C_{1-2}$ alkyl, $C_{1-2}$ alkoxy and phenyl; phenyl $C_{1-2}$alkyl, or 1-phenylpropenyl-3 (the phenyl group of each of the last two substituents (phenyl $C_{1-2}$alkyl or 1-phenylpropenyl-3) being unsubstituted or substituted by one or two groups selected from chloro, methyl and $C_{1-2}$ alkoxy or one group nitro or $R_5'$ is alpha and beta naphthyl; and Y' is a group of the formula $-CH_2CH_2-$ or $-CH_2CH(CH_3)-$.

18. A compound according to claim 17 in which the compounds of formula Id are those in which $D_4$ is $D_5$ where $D_5$ is 2,6-dichloro-4-nitrophenyl or 2-cyano-4-nitrophenyl and $R_{1a}$ is hydrogen, $R_{3b}$ is $C_{1-4}$alkyl, $R_4'$ is hydrogen and Y' is $-CH_2CH_2-$.

19. A process for dyeing a substrate comprising applying to the substrate a compound of claim 1.

20. A process for preparing a compound according to claim 1 comprising coupling one mole of a diazotized amine of formula II $$D-NH_2 \qquad (II)$$

with one mole of a compound of formula III $$H-K-N(R_3)-Y-CO-O-R \qquad (III)$$

where the symbols are as defined in claim 1.

* * * * *